US010718405B2

(12) United States Patent
Campbell

(10) Patent No.: US 10,718,405 B2
(45) Date of Patent: Jul. 21, 2020

(54) METHODS AND DESIGNS FOR BALANCING A STRANDED TERMINATION ASSEMBLY

(71) Applicant: Richard V. Campbell, Havana, FL (US)

(72) Inventor: Richard V. Campbell, Havana, FL (US)

(73) Assignee: Bright Technologies, LLC, Havana, FL (US)

( * ) Notice: Subject to any disclaimer, the term of this patent is extended or adjusted under 35 U.S.C. 154(b) by 211 days.

(21) Appl. No.: 15/831,755

(22) Filed: Dec. 5, 2017

(65) Prior Publication Data

US 2018/0245666 A1 Aug. 30, 2018

Related U.S. Application Data

(63) Continuation-in-part of application No. 14/697,551, filed on Apr. 27, 2015, now Pat. No. 9,835,228.

(60) Provisional application No. 61/984,830, filed on Apr. 27, 2014.

(51) Int. Cl.
*F16G 11/12* (2006.01)
*D07B 5/00* (2006.01)
*F16G 11/02* (2006.01)
*D07B 9/00* (2006.01)

(52) U.S. Cl.
CPC ............... *F16G 11/12* (2013.01); *D07B 5/00* (2013.01); *F16G 11/025* (2013.01); *D07B 9/00* (2013.01); *D07B 2201/1096* (2013.01); *D07B 2401/2055* (2013.01)

(58) Field of Classification Search
CPC .......... D07B 5/00; F16G 11/025; F16G 11/12
See application file for complete search history.

(56) References Cited

U.S. PATENT DOCUMENTS

| | | | | |
|---|---|---|---|---|
| 2,762,598 A * | 9/1956 | Runge | ............... | F21V 21/112 248/327 |
| 3,016,760 A * | 1/1962 | Wrighton | ............... | F16G 11/12 74/501.5 R |
| 3,467,158 A * | 9/1969 | Pasbrig | ............... | F16B 39/08 411/251 |
| 4,013,266 A * | 3/1977 | Lapp | ............... | F16G 11/12 254/228 |
| 4,014,518 A * | 3/1977 | Lapp | ............... | F16G 11/12 206/335 |
| 4,433,831 A * | 2/1984 | Bunger | ............... | F16G 11/12 256/39 |
| 4,464,812 A * | 8/1984 | Crook, Jr. | ............... | F16G 11/05 24/122.6 |

(Continued)

*Primary Examiner* — Shaun R Hurley
(74) *Attorney, Agent, or Firm* — J. Wiley Horton

(57) ABSTRACT

Devices and methods for loading a cable in order to create a desired distribution of the load among the cable's constituent strands. Strand terminations are applied to many—and possibly all of—the cable's strands. The ultimate goal is to connect the strand terminations to a collector in order to create an overall cable termination. The relationship between each strand termination and the collector is allowed to "float" using the inventive process while the cable is tensioned and an appropriate spatial relationship between each strand tensioner and the collector is determined. Once the appropriate relationship is found, it is configured to be repeatable (such as by recording its position for later application to the same or similar collector).

20 Claims, 31 Drawing Sheets

(56) References Cited

U.S. PATENT DOCUMENTS

| | | | | |
|---|---|---|---|---|
| 5,480,203 | A * | 1/1996 | Favalora | B25B 25/00 24/115 N |
| 6,761,342 | B1 * | 7/2004 | Giefer | F21S 8/061 248/328 |
| 8,371,015 | B2 * | 2/2013 | Campbell | F16G 11/042 29/525.01 |
| 8,385,712 | B2 * | 2/2013 | Ahmed | G02B 6/4463 29/438 |
| 8,757,594 | B2 * | 6/2014 | Jordan | H02G 1/081 254/134 |
| 8,831,395 | B2 * | 9/2014 | Sievers | G02B 6/4439 385/135 |
| 8,961,061 | B2 * | 2/2015 | Wahlberg | F16G 11/025 403/275 |
| 2005/0169702 | A1 * | 8/2005 | Paulshus | B63B 21/502 403/300 |
| 2005/0208829 | A1 * | 9/2005 | Campbell | H01R 13/40 439/587 |
| 2006/0160435 | A1 * | 7/2006 | Campbell | F16G 11/025 439/878 |
| 2010/0104377 | A1 * | 4/2010 | Campbell | F16G 11/042 405/259.5 |
| 2011/0067220 | A1 * | 3/2011 | Campbell | F16G 11/042 29/428 |
| 2014/0137388 | A1 * | 5/2014 | Campbell | F16G 11/042 29/461 |
| 2015/0132044 | A1 * | 5/2015 | Tylaska | F16G 11/10 403/46 |
| 2015/0300452 | A1 * | 10/2015 | Campbell | F16G 11/025 403/275 |
| 2015/0344120 | A1 * | 12/2015 | Dazet | B64C 1/069 244/119 |
| 2016/0333581 | A1 * | 11/2016 | Van Dore | E04B 9/0478 |
| 2018/0051522 | A1 * | 2/2018 | Sjostedt | B29C 70/84 |

* cited by examiner

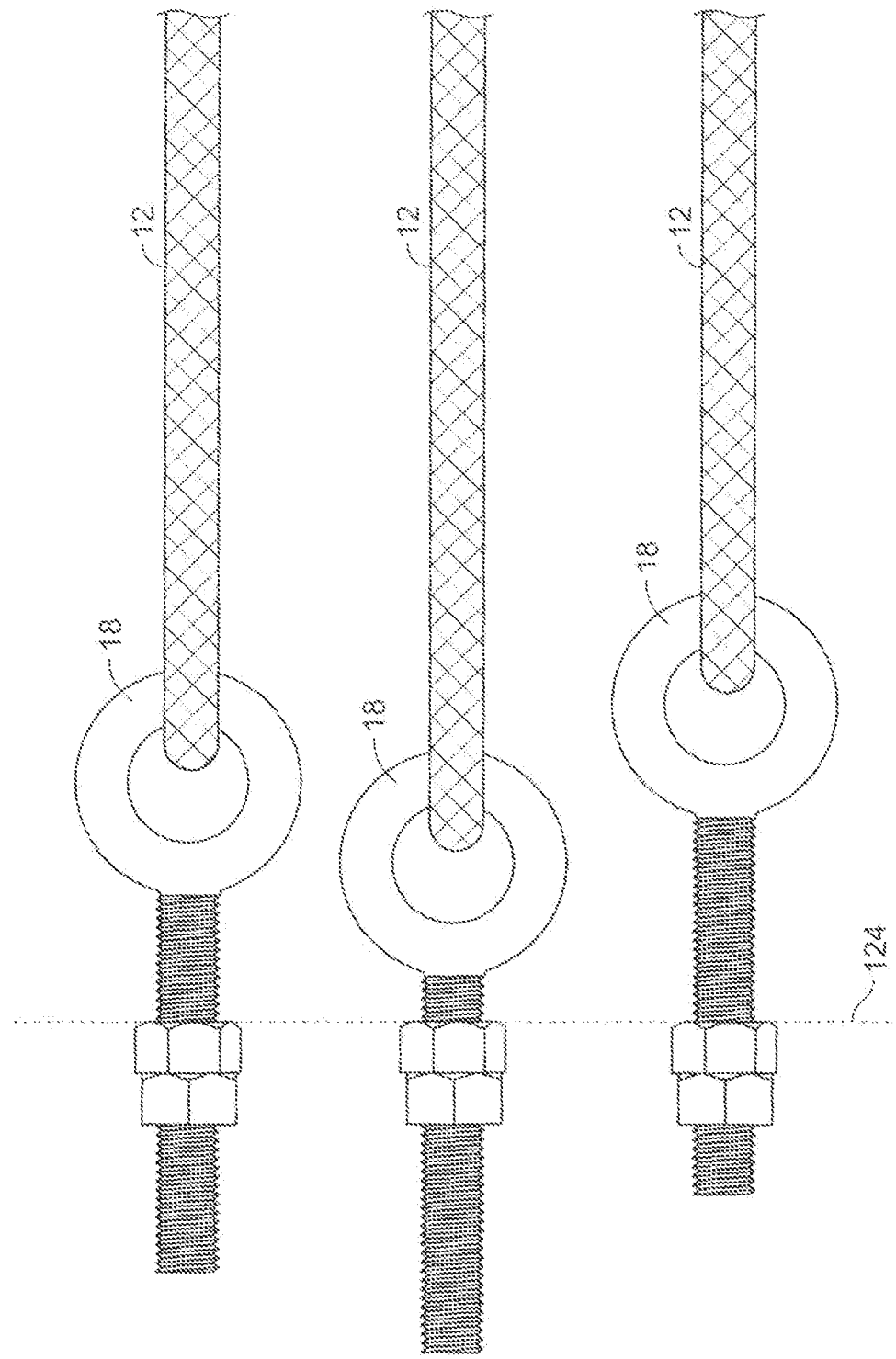

METHODS AND DESIGNS FOR BALANCING A STRANDED TERMINATION ASSEMBLY

CROSS-REFERENCES TO RELATED APPLICATIONS

This non-provisional patent application claims the benefit of an earlier-filed non-provisional application. The patent application was assigned Ser. No. 14/697,551. It listed the same inventor.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

Field of the Invention

This invention relates to the field of tensile strength members such as multi-stranded synthetic cables. More specifically, the invention comprises devices and methods for balancing the load carried by a synthetic cable among its constituent strands.

Description of the Related Art

A cable must generally be provided with one or more end connections in order to be useful. The end connections allow the cable to carry and transmit a useful load. An end connection may be a simple device—such as a large hook—employed to connect the cable to an anchoring point. Larger synthetic cables typically include multiple constituent strands. It is preferable to attach an individual connective device to each strand. Such a connective device is referred to in this disclosure as a "strand termination." Multiple strand terminations are connected together somehow to create a unified cable end connection. The unified cable end connection is referred to in this disclosure as an "overall cable termination."

For small cables simple end-fittings work fairly well. For larger cables, however, more complicated end-fittings are needed in order to produce acceptable break strength. This is particularly true for large, multi-stranded cables made of synthetic filaments (having diameters of 20 mm or more). FIG. 1 shows a cable 10 made from advanced high-strength synthetic filaments. Some terminology used in the construction of cables will benefit the reader's understanding, though it is important to know that the terminology varies within the industry. For purposes of this patent application, the smallest individual component of the cable is known as a "filament." A filament is often created by an extrusion process (though others are used). Many filaments are grouped together to create a strand 12. The filaments are braided and/or twisted together using a variety of known techniques in order to create a cohesive strand. There may also be sub-groups of filaments within each strand. As the overall cable size gets larger, more and more layers of filament organization will typically be added. The strands 12 are typically braided and/or twisted together to form cable 10. In other examples the strands may be purely parallel and encased in individual surrounding jackets. In still other examples the strands may be arranged in a "cable lay" pattern that is well known in the fabrication of wire ropes.

Many different materials are used for the filaments in a synthetic cable. These include DYNEEMA, SPECTRA, TECHNORA, TWARON, KEVLAR, VECTRAN, PBO, carbon fiber, nano-tubes, and glass fiber (among many others). In general, the individual filaments have a thickness that is less than that of human hair. The filaments are very strong in tension, but they are not very rigid. They also tend to have low surface friction. These facts make such synthetic filaments difficult to handle during the process of adding a termination and difficult to organize. The present invention is particularly applicable to terminations made of such high-strength synthetic filaments, for reasons which will be explained in the descriptive text to follow. While the invention could in theory be applied to older cable technologies—such as wire rope—it likely would offer little advantage and the additional time and expense of implementing the invention would not be worthwhile. Thus, the invention is not really applicable to wire rope and other similar cables made of very stiff elements.

The cable shown in FIG. 1 is a well-known exemplary construction made by braiding or otherwise interrelating twelve strands together. Polyester ropes using this construction are known to have an external diameter up to about 6 inches (see specification MIL-R-24750). Even larger polyester ropes are made by constricting parallel sub-ropes in a braided-strand jacket.

When a cable has non-parallel strands the interrelationship between the strands becomes quite complex. The overall cable has a central axis. Each individual strand is on average running parallel to the cable's central axis. However, at any given point along the cable's length, no individual strand is parallel to the cable's central axis. When such a cable is loaded, the individual strands move and shift. The cable "clinches" together and strand-to-strand friction becomes a significant component of the cable's performance. When a large amount of tension is applied to such a cable in its initial post-manufacturing state, it is known for the cable's diameter to shrink by up to 30%. The individual strands must slip over one another and settle into a stable configuration.

It is important for the overall strength of most cables—the 12-strand configuration of FIG. 1 being a good example—that the overall load be shared equally among the constituent strands. For a 12-strand construction, the ideal result is that each strand carries exactly $1/12$ of the total load. Other cables may have a desired non-equal tension distribution, such as a cable having some relatively large strands and other relatively small strands. However, in all cases, it is preferable to have a "target" distribution of tension among the constituent strands and to provide a system that meets this target distribution.

High-strength synthetic filaments have very little surface friction and strands made of these filaments also have very little surface friction. Thus, it is possible for one individual strand to "slip" with respect to neighboring strands. A strand that slips tends to "unload" itself and shift the load it was carrying to its neighbors. This is obviously an undesirable result.

In order to add an overall cable termination to an end of a multi-stranded synthetic cable, each individual strand must be cut to length and have a strand termination added (It is not essential that all strands in the cable undergo this process but in most embodiments all strands will be involved). The cutting and terminating processes are inherently imperfect.

The result will generally be that some terminated strands will wind up being longer than desired while others will wind up being shorter then desired. If a tensile load is placed on the cable with no accommodation for these manufacturing tolerances, the relatively "short" strands will be loaded first and they will carry more load than the relatively long strands.

One approach to reducing this problem is to make the application of a tensile load to each strand individually adjustable. In order to achieve this goal a tension-applying apparatus may be applied to each strand termination individually. Looking again at FIG. 1, the reader will note how the strands on the free end of cable 10 have been unbraided so that they are individually accessible.

FIG. 2 shows a section view through a strand termination 30 that has been added to the free end of an individual strand 12. The prior art approaches to adding a termination are explained in detail in commonly-owned U.S. Pat. Nos. 7,237,336, 7,669,294, 8,048,357, 8,236,219, and 8,371,015, which are hereby incorporated by reference. These prior patents generally concern potted terminations, but as discussed previously the invention applies to all types of termination.

FIG. 2 shows a sectional view through the components used to create the termination. The reader will note that anchor 18 includes an expanding cavity 20 that expands as one proceeds from the portion of the anchor facing the length of cable (the "proximal" end, which is the bottom end in the orientation of the view) toward the portion of the anchor facing in the opposite direction (the "distal" end, which is the top end in the orientation of the view). The expanding cavity in this example is a linear taper between two straight portions—all joined by fillets. Differing wall profiles may be used to create a wide variety of expanding cavities.

The end portion of strand 12 is potted into the expanding cavity in order to lock anchor 18 to strand 12. The filaments of the strand are splayed apart and infused with liquid potting compound (either before or after being placed within expanding cavity 22). The liquid potting compound may be added by a variety of methods, including: (1) "painting" or otherwise wetting the filaments with potting compound and then sliding the anchor into position over the painted filaments, (2) positioning the splayed filaments in the cavity and then pouring in potting compound, (3) pre-wetting the filaments in a separate mold designed to wet the filaments, and (4) injecting pressurized potting compound into the cavity. However the potting compound is introduced, the splayed filaments remain within cavity 20 while the potting compound hardens. Once it has hardened the result is a mechanical interlock between the filament-reinforced "plug" (contained in potted region 22) of solid material and the cavity. Tension applied to the cable will thereby be transmitted to the strand.

The potting compound used is typically a high-strength resin. However, the term "potting compound" as used in this description means any substance which transitions from a liquid to a solid over time.

Potting is only one approach known in the art. Other common examples include "spike-and-cone" or "spike-and-barrel" designs, compression or friction fittings, composite-connections, capstan wrapping, etc. The most common approach is wrapping a length of filaments around an eye on the end of the strand and splicing a length of the strand back into itself—typically referred to as a "spliced eye." The present invention is applicable to any method of creating a termination on the end of a synthetic filament tensile member. Although potted examples are shown in these descriptions the invention is not limited to that approach, and the reader should understand the term "strand termination" to broadly encompass all methods of attaching a device to the end of a strand.

FIG. 2 shows additional components that are added to facilitate the gathering of multiple strands into a single, load-transferring element. In the example shown, loading stud 24 has been connected to anchor 18 via threaded engagement 28. Loading stud 24 includes male thread 26 over a significant length (The threads are shown schematically but are not actually depicted for purposes of visual clarity). This threaded stud allows the completed assembly to be attached to other things to ultimately create an overall cable termination.

The use of a threaded stud is a "high-end" example. In other instances the anchor will simply be a cylinder with a load-bearing flange facing downward in the orientation of FIG. 2. The connection between the cylinder and another object could then be placing the load-bearing flange against another surface.

FIG. 3 shows the cable after an identical (in this example) strand termination 30 has been added to the end of each strand 12. The reader will observe how a length of each strand is preferably unbraided from the cable structure so that a free length exists proximate the termination. This allows each strand to be manipulated so that it may be attached to another device. A separate device or devices is used to aggregate all the individual strands and strand terminations to a unified load-transferring assembly. This unified assembly will be referred to as an "overall cable termination" in order to distinguish it from the individual "strand terminations" applied to each strand. The design of the strand terminations, the overall cable termination, and the unifying devices employed to create the overall cable termination, can take on many and various forms. The present invention is applicable to all of these forms.

As stated previously, it is ideal for each strand within a cable assembly to carry an equal percentage of the total load (other than for cables designed to distribute the load unequally). However, when a cable made of synthetic filaments is first terminated and loaded, the manufacturing tolerances will generally cause some strands to shift or "slip" relative to others—thereby altering the proportional load sharing that was intended. The present invention loads the cable in a controlled and carefully designed manner resulting in a reduction in misalignments and a more evenly distributed load among the cable's constituent strands.

Throughout this disclosure cables will be used as an example of a tensile strength member. However the invention should not be viewed as being limited to cables. The term "tensile strength member" or "tensile member" encompasses cables and sub-components of cables such as strands. The invention also encompasses non-cable structures intended to carry loads in tension.

Likewise, the term "anchor" should be viewed broadly to encompass virtually anything that can be attached to a strand or cable. The anchor would ordinarily include some features facilitating attachment—such as a hook or threads.

BRIEF SUMMARY OF THE PRESENT INVENTION

The present invention comprises devices and methods for loading a cable in order to create a desired distribution of the load among the cable's constituent strands. Strand terminations are applied to many—and possibly all of—the cable's strands. The ultimate goal is to connect the strand terminations to a collector in order to create an overall cable termination. The relationship between each strand termination and the collector is allowed to "float" using the inventive process while the cable is tensioned and an appropriate spatial relationship between each strand tensioner and the collector is determined. One the appropriate relationship is found, it is configured to be repeatable (such as by locking the strand termination in place or by recording its position for later application to the same or similar collector).

In a preferred embodiment, a strand tensioner is provided for each individual strand termination. Tension is applied to the cable through the strand tensioners. Tension may be individually adjusted for each strand (up or down) in order to achieve a predetermined apportionment of the overall load.

BRIEF DESCRIPTION OF THE SEVERAL VIEWS OF THE DRAWINGS

FIG. 12 is a side elevation view, showing an assembly used to apply loads to all the strands in a cable assembly in a controlled fashion.

FIG. 31 is an elevation view, showing the use of a different type of anchor.

Figure 1:
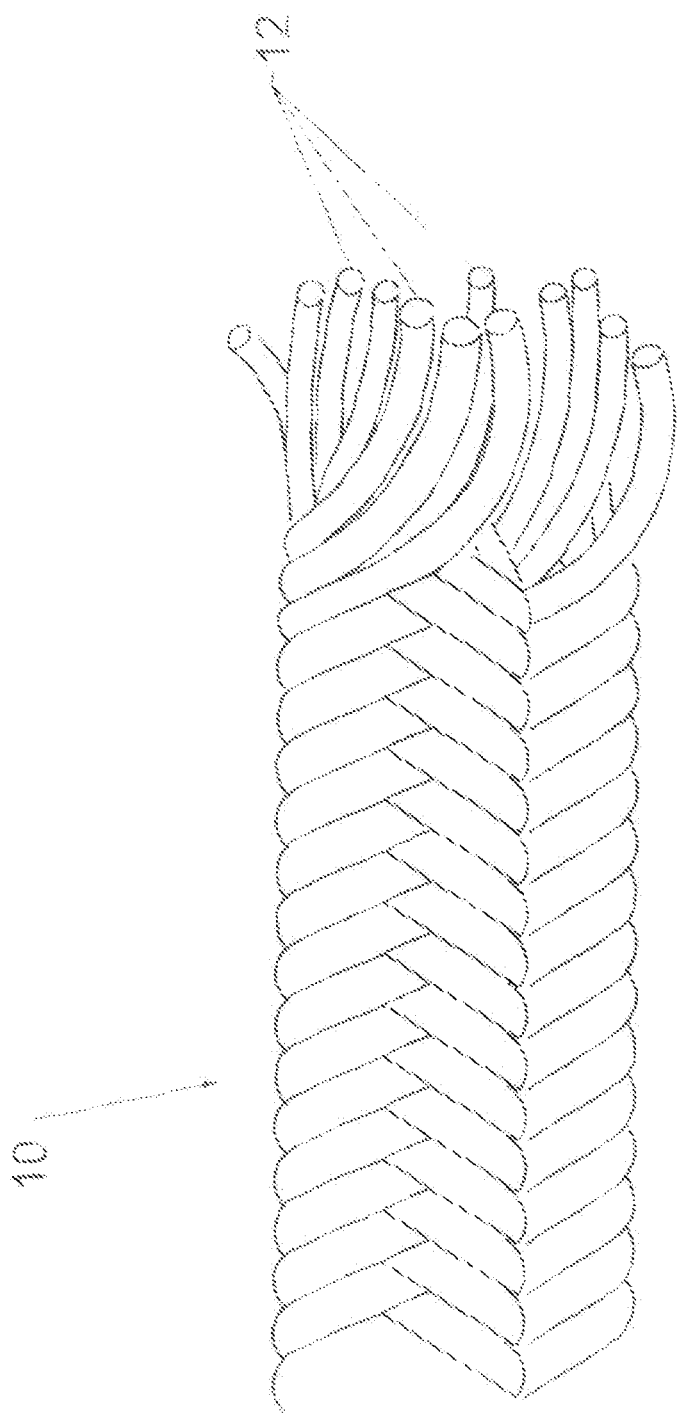
FIG. 1 is an elevation view, showing the braided structure of an exemplary 12-strand cable.
Figure 2:
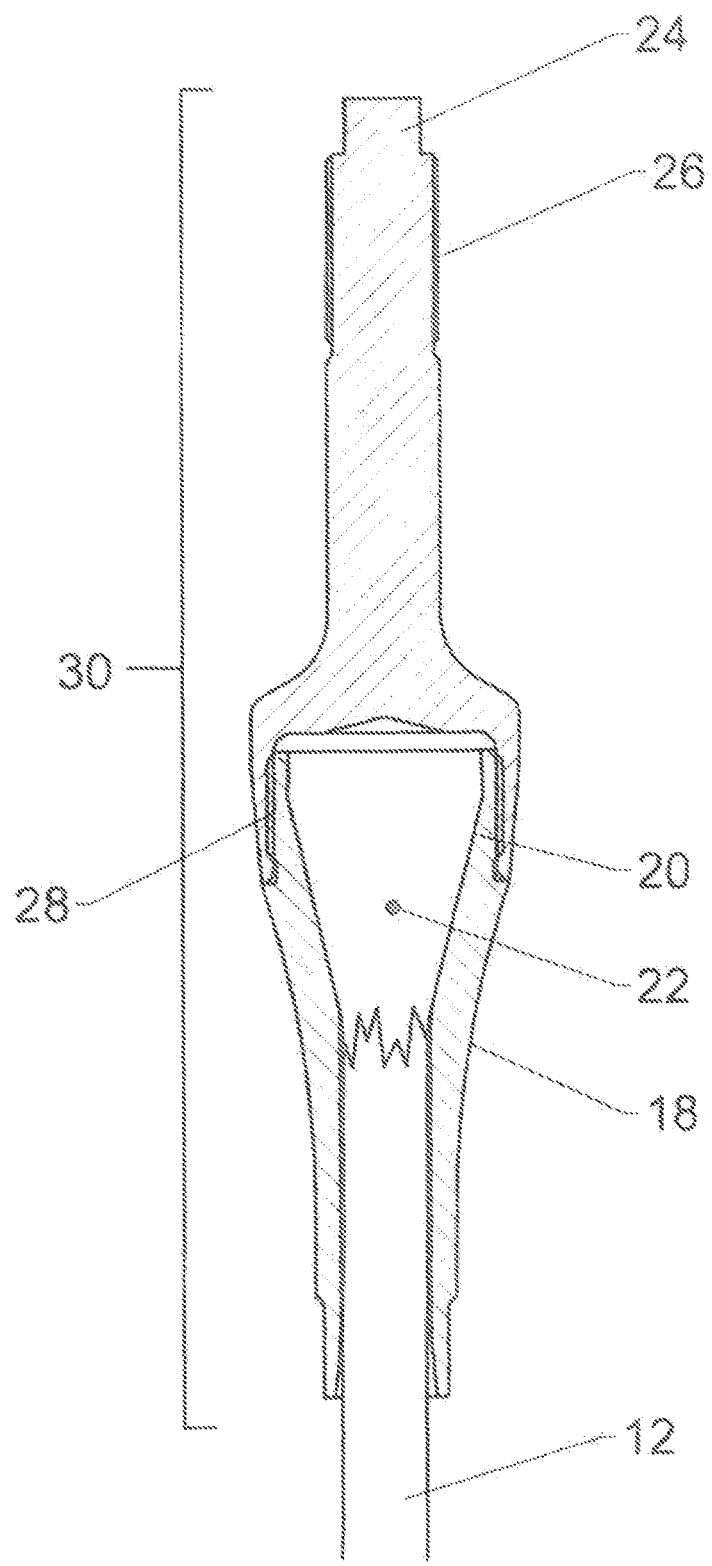
FIG. 2 is a sectional sectional view, showing a termination created on the end of a single cable strand.

REFERENCE NUMERALS IN THE DRAWINGS 10 cable
12 strand
18 anchor
20 cavity
22 potted region
24 loading stud
26 male thread
28 threaded engagement
30 termination
34 collector
36 loading flange
38 receiver
40 nut
42 washer
44 hemi bearing
46 opening
48 coupler
50 strand tensioner
52 cylinder
54 mount
56 rod
58 fixture
60 pressure controller/sensor
62 process controller
64 displacement sensor
66 space frame
68 collector brace
70 primary load fixture
72 hydraulic cylinder
74 attachment
76 boss
78 hole
80 lock wire
82 cross hole
84 castellated nut
86 notch
88 strand tensioner
90 telescoping clevis
92 flat
94 load cell
96 wiring
98 female threaded receiver
100 relief bore
102 stop insert
104 linear encoder
106 digital output 108 rod extension coupling
110 reference numerals
112 hash mark
114 wrench flat
116 start position mark
118 angular position mark
120 multi tier termination
124 collector plane
126 collector plane
128 loading collar
130 fixture
132 tension rod
134 loading flange
136 shim
138 shim
140 shim

DETAILED DESCRIPTION OF THE INVENTION

Figure 4:
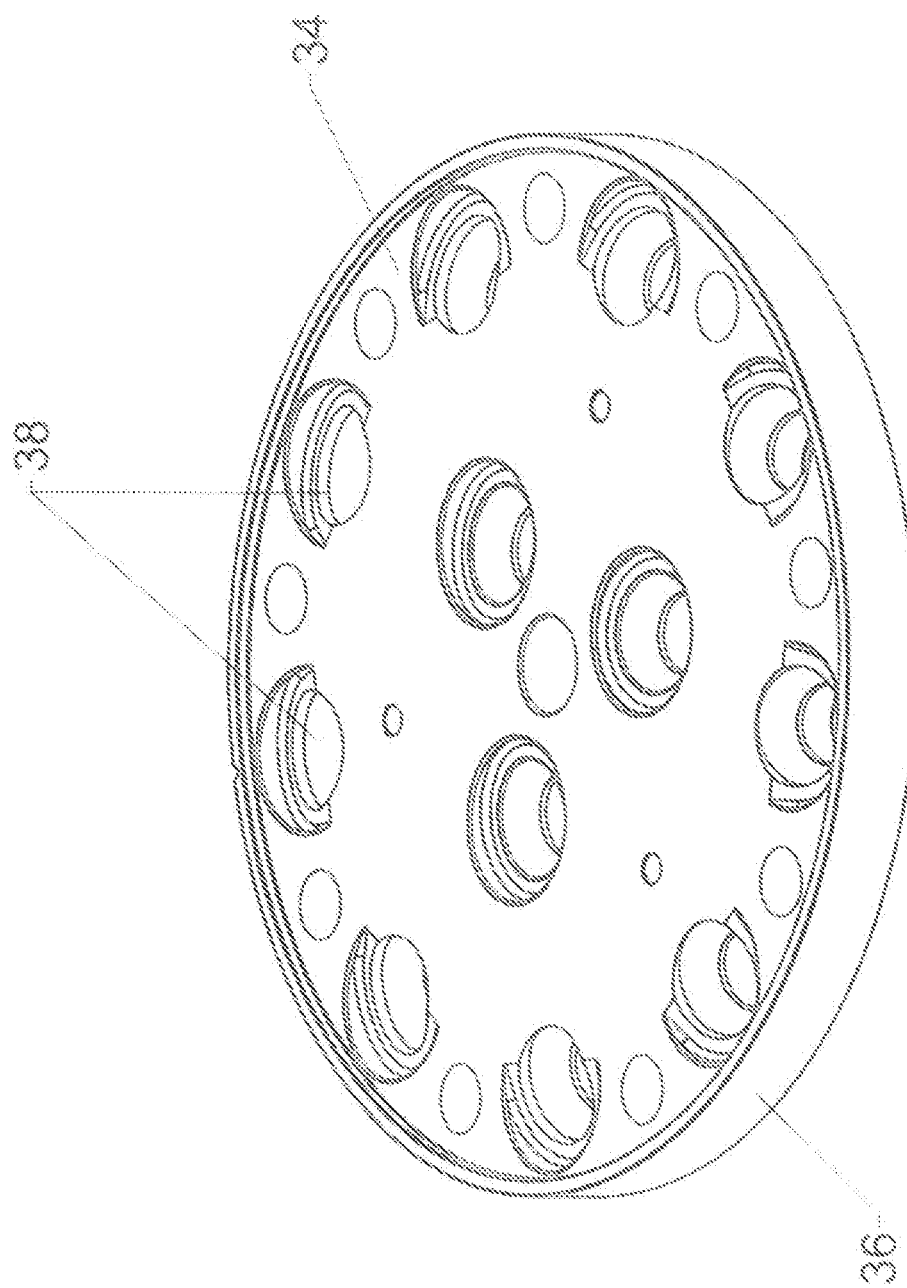
FIG. 4 is a perspective view, Showing a collector used to assemble the 12 terminations of FIG. 3.

FIG. 4 shows an exemplary device used to gather all the strands into a unified whole and thereby create an overall cable termination. Collector 34 includes twelve receivers 38, each of which is configured to connect to a single strand termination (In other embodiments a receiver may be configured to connect to multiple strand terminations). Collector 34 typically includes some type of load-transferring feature designed to transfer a load from the collector to some external element. Loading flange 36 is a simple example of a load-transferring feature. The collector in this example is very simplistic and is unlikely to represent a design that would actually be used. However, it does serve well to clearly illustrate the inventive features.

Figure 5:
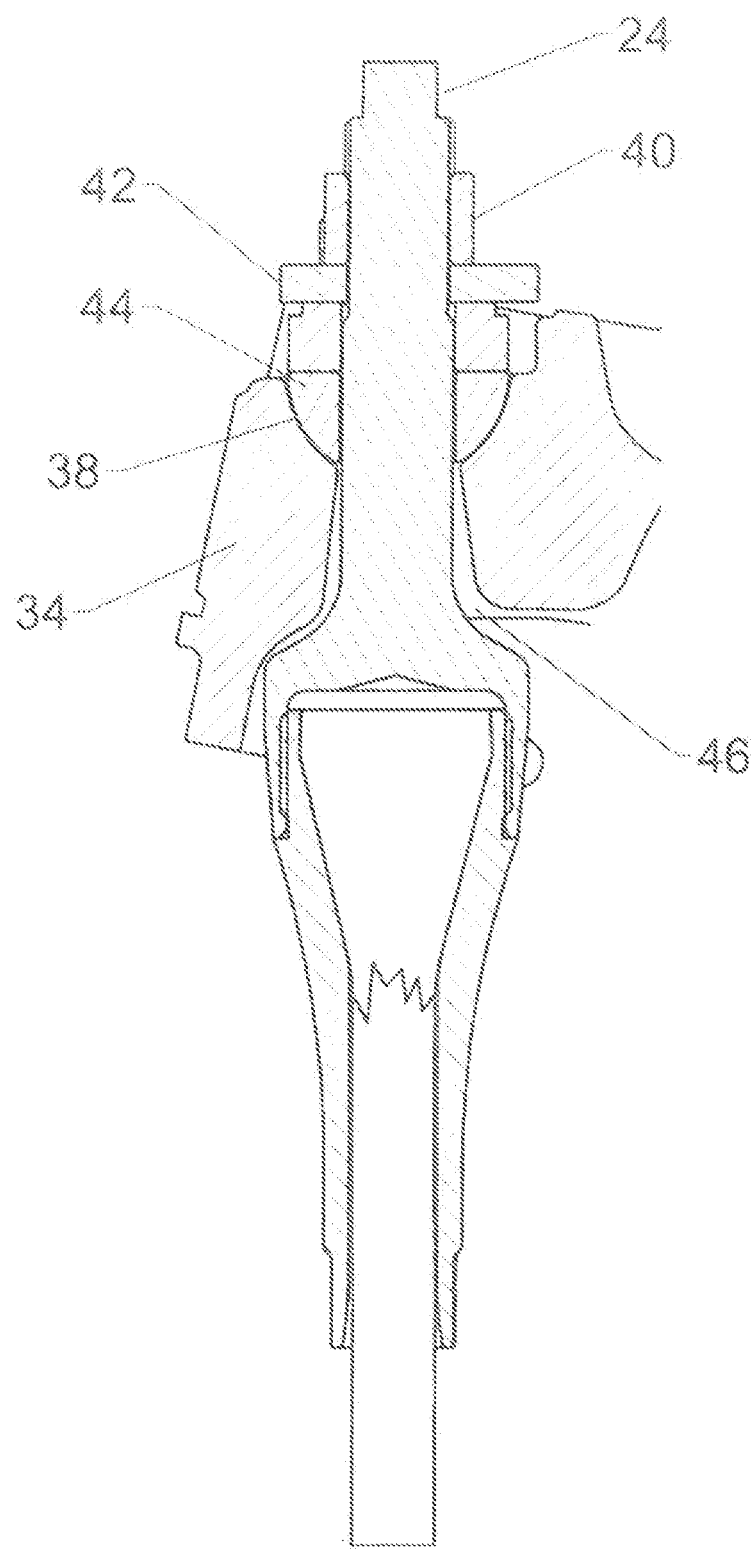
FIG. 5 is a sectional perspective view, showing an exemplary attachment between a termination and a collector.

FIG. 5 shows an exemplary connection between a termination on a strand and the collector. Loading stud 24 is passed through opening 46 and through receiver 38 in collector 34. Receiver 38 includes a hemispherical concave portion sized to accept hemi bearing 44. Hemi bearing 44 and receiver 38 form a ball-and-socket connection that allows the termination to rotate with respect to collector 34. This is a sophisticated type of connection that won't be included in many embodiments. Many embodiments will simply use a washer bearing against a flat surface on collector 34. Still other embodiments won't use a threaded stud and will instead simply mate two surfaces together to make the connection.

Nut 40 can be selectively tightened on loading stud 24 (the threads are not shown in the view) in order to urge washer 42 against hemi bearing 44 and hemi bearing 44 against receiver 38. To apply the inventive method, collector 34 is ordinarily placed in a loading fixture that holds it in position. The far end of the cable to which the strand belongs is likewise held in place (such as by winding it around a capstan or some other means, such as applying an overall cable termination to the far end). A substantial tensile load is then applied to the cable as a whole. Those skilled in the art will then appreciate that by tightening or loosening nut 40 a user can fine tune the tension on the particular strand to which loading stud 24 is attached (as well as its position with respect to collector 34). The ball-and-socket connection in this embodiment allows the strand termination to align itself with the strand during this process.

Figure 6:
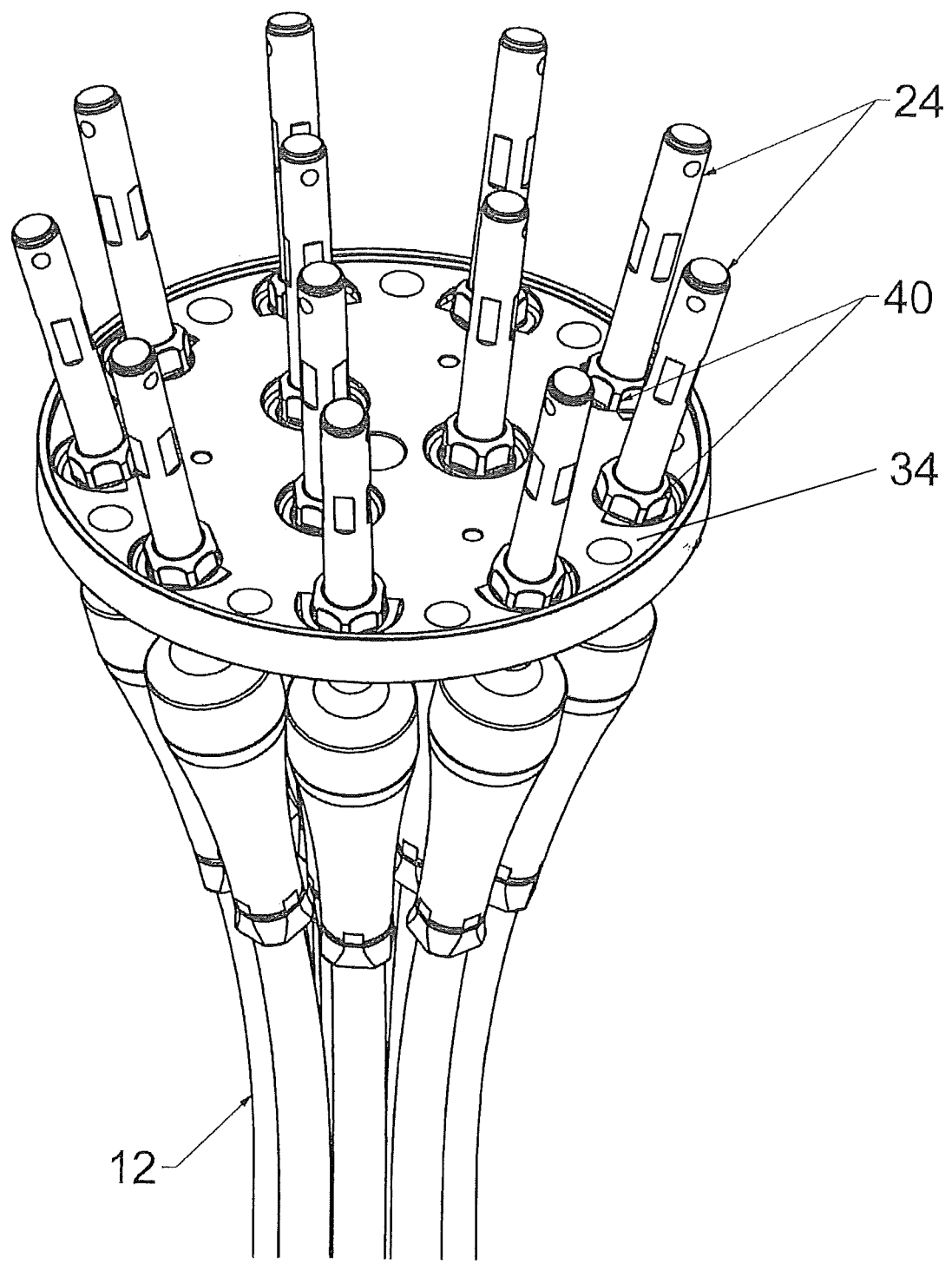
FIG. 6 is a perspective view, showing all 12 terminations attached to the collector.

FIG. 6 shows an assembly of collector 34 and all twelve strands. The reader will observe that twelve loading studs 24 are in position and a nut 40 is connected to each stud (The loading studs 24 shown in FIG. 6 are longer than depicted in FIG. 5 in order to give an additional range of adjustment.

Also—the threads on the exterior surface of the loading studs are again omitted for purposes of visual clarity). This view illustrates the advantage of including a ball-and-socket connection in some of the embodiments. As each strand emerges from the cable's braided construction it assumes a particular angle with respect to the collector. Some diverge more than others, and the ball-and-socket connection accommodates this divergence. Of course, one could carefully determine a fixed angle to use for each strand. However, this is difficult as cable construction varies even within the same braiding scheme.

The ball-and-socket connection should properly be viewed as one example among many possible connection types. The reader is referred to commonly-owned U.S. Pat. No. 8,371,015 for additional examples regarding the application of an attachment to a sub-component of a larger cable.

The term "collector" in this context should be viewed broadly as anything that is used to collect a tensile load from two or more strand terminations. It may be a unified piece as shown but may also be an assembly of multiple pieces. Further, a "stand-in" collector may be used to pre-load the cable and adjust each of the strand terminations (as described subsequently) and the strand terminations may ultimately be connected to an entirely different collector.

It is not common for a user to take an assembly for a large cable such as shown in FIG. 6 and place it into service without pre-loading the assembly and testing it. It is important to pre-load the assembly to settle the strands and other components into a stable configuration before the cable is placed into service. In this context it is desirable to know a particular cable's maximum working load in the service environment it is destined to enter. The pre-load process might apply a tension to the cable that is equal to 100% or even as much as 150% of the expected maximum working load.

While most large cables are pre-loaded as a whole, the present invention seeks to pre-load the cable at the strand level and manipulate the strand termination to collector connections in order to create a desired apportionment of the overall load among the constituent strands. Without careful preloading a large cable assembly will very likely have an uneven distribution of load to each individual strand. The inventive process significantly reduces this phenomenon.

One could use the configuration of FIG. 6 to progressively tighten all twelve nuts and thereby place an initial load on the cable. Such a process would be unlikely to produce an optimal result, however. The present invention obtains advantages by individually applying tension to the strands in a large, multi-stranded cable.

Figure 13:
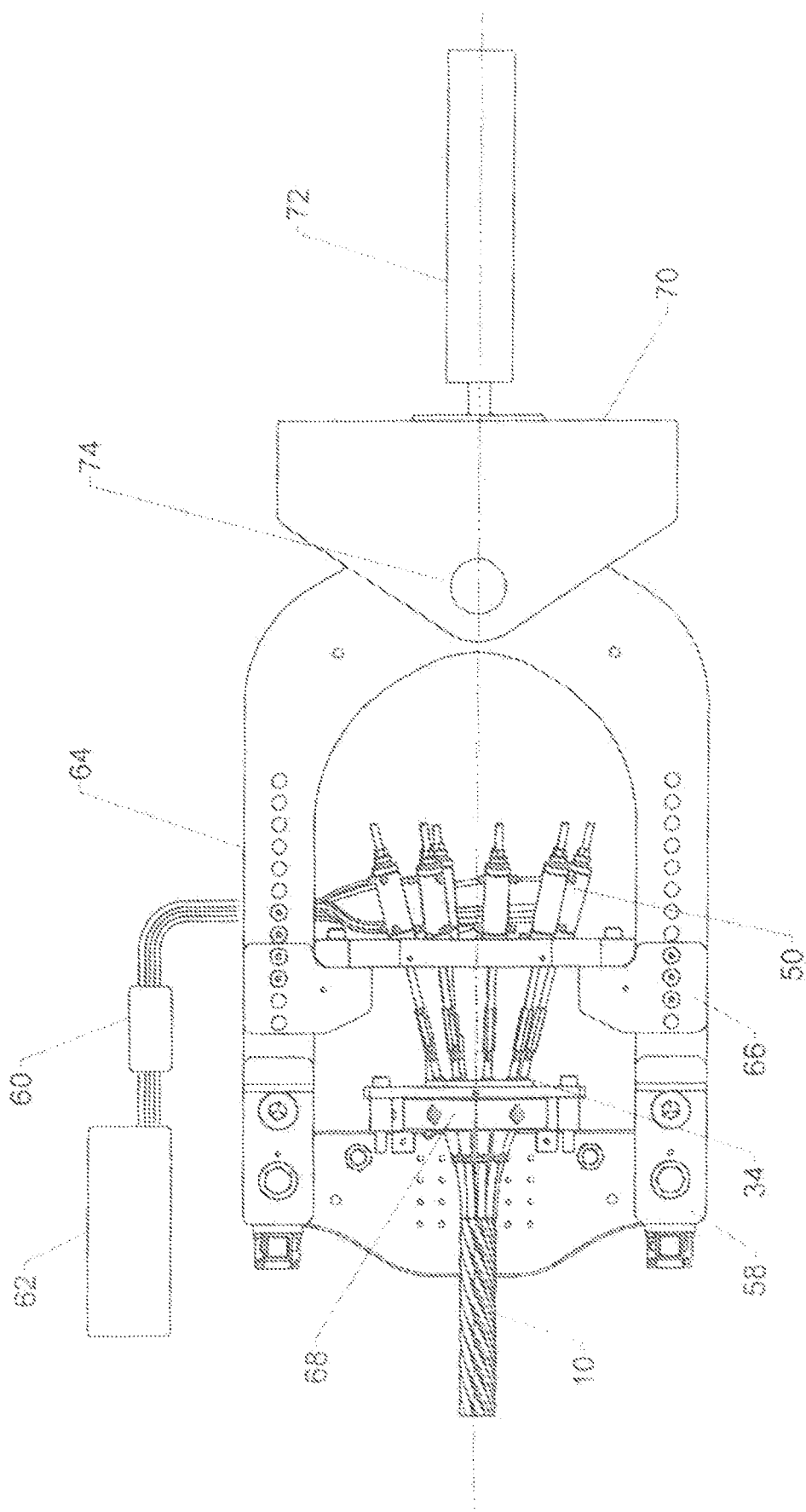

FIG. 13 shows an exemplary apparatus that can be used to apply the desired pre-load to a cable. Fixture 58 holds collector 34 in place via collector brace 68. This fixture includes a central passage through which cable 10 freely passes. The far end of cable 10 (not shown) must be held statically, such as by winding it around a capstan or providing a second collector on the far end.

Collector 34 is held within fixture 58 during the tensioning process. Significantly, however, it is not generally used to apply any tension to the cable strands during the pre-loading process. During the process, each individual strand termination is allowed to float with respect to collector 34. Tension to the cable is actually applied directly through the strand terminations themselves (as will be described subsequently). As tension is applied, the inventive components operate to apportion the overall load among the individual strands in a predetermined arrangement (usually this will be an equal load applied to each strand but there are exceptions). Once the desired pre-load is applied and the strand terminations are adjusted to achieve the desired load apportionment, then the relationship between each strand termination and the collector is established (such as by locking the strand termination to the collector in the desired position or by recording the desired position so that it can later be reestablished).

In the embodiment of FIG. 13, collector 34, fixture 58, space frames 66, fixture 64, and all the connected components move in unison. This entire assembly may slide within a larger frame or otherwise be stabilized.

In this exemplary apparatus one or more hydraulic cylinders 72 connect primary load fixture 70 to attachment 74 on the moving assembly. The right side of the one or more hydraulic cylinders 72 (in the orientation of the view) is fixed to a substantial and stationary anchor point. When the one or more hydraulic cylinders 72 are activated, the moving assembly (along with collector 34) is urged to the right in the view. This action applies tension to cable 10 (since the far end of the cable is held).

The frame structures shown are preferably very stout so that a large tensile load may be applied. For some cables it may be desirable to provide a tensile load of 1 million pounds or more.

Figure 3:
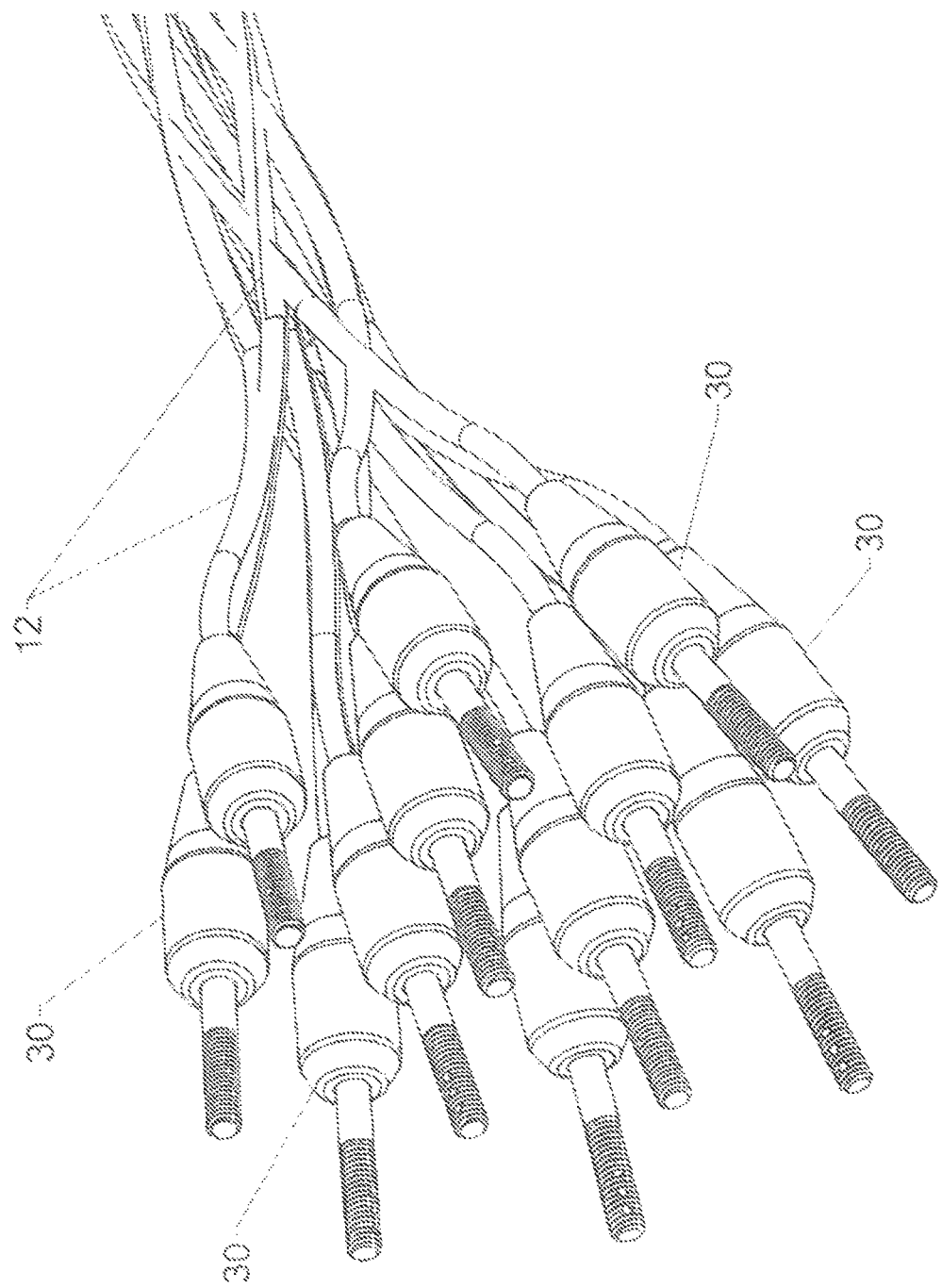
FIG. 3 is a perspective view, showing 12 terminations attached to 12 strands in an exemplary cable.

Simply applying a defined pre-load using a common "pull" for the entire cable will rarely produce a desired apportionment of the overall load among the cable's constituent strands. One reason for this fact is that it is virtually impossible for all the stands of the cable to have exactly the designed length. Returning to FIG. 3, the reader will recall that each individual strand must be cut to length and have a strand termination added to its free end. The manufacturing tolerances of both the cutting operation and the termination operator can only go so far. Some of the strands will wind up being shorter than designed and others will wind up being longer than designed. Of course, when the cable is initially placed under tension, the shorter strands will carry most of the load and the longer strands may in fact carry very little. For this reason, it is desirable to be able to adjust the position of each of the strand terminations with respect to the collector.

Looking now at FIG. 6, the reader will recall that the preferred connections between each strand termination and the collector include an adjustment feature. The adjustment feature in the embodiment of FIG. 6 is the nut 40 placed on each loading stud 24. These nuts can be tightened manually to provide the desired adjustment. There are many other ways to adjust the spatial relationship between a strand termination and the collector. However the adjustment is made, it is desirable to automate the process of apportioning the load among the various strands.

Returning now to FIG. 13, the reader will observe that each loading stud on each individual strand is attached to a strand tensioner 50. All the strand tensioners are attached to fixture 64. Thus, when the moving assembly is moved to the right under the force imparted by the one or more hydraulic cylinders 72, it is the strand tensioners (50) (in this particular embodiment) that actually apply the tension to the cable. The loading stud on each strand passes through the collector but should not transfer any significant forces to the collector. Instead, the loading stud is attached to its respective strand tensioner 50.

Figure 7:
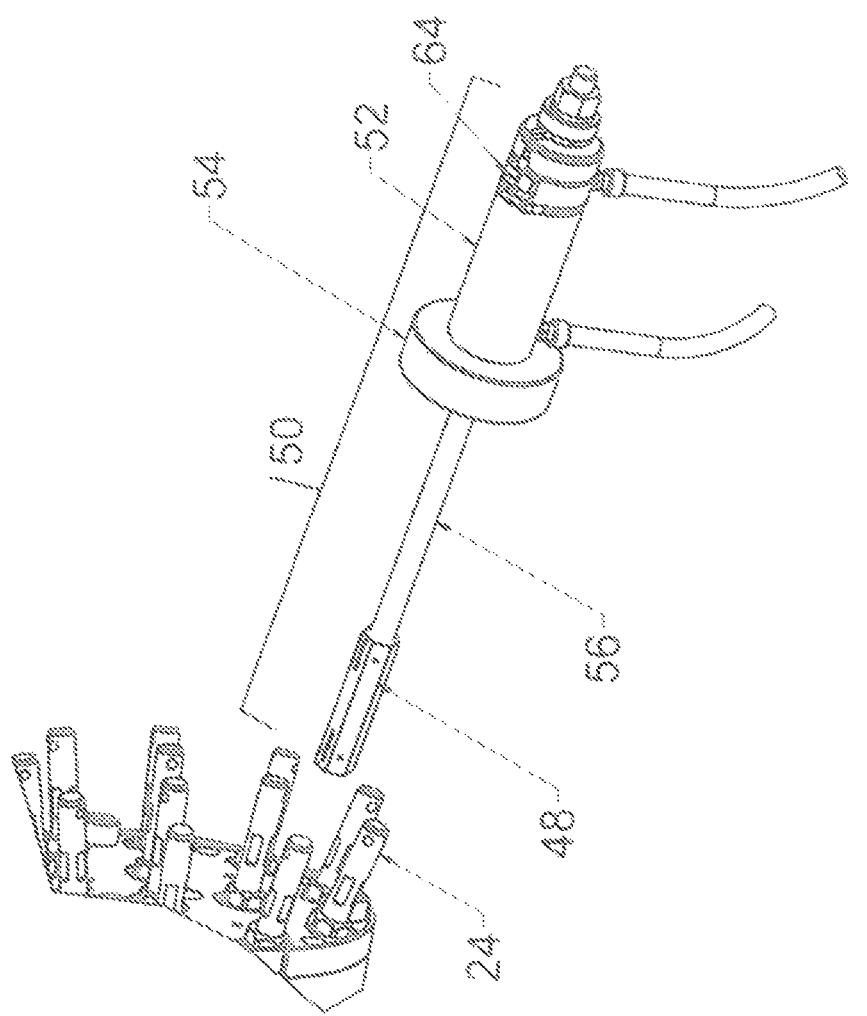
FIG. 7 is a perspective view, showing a particular type of strand tensioner.

FIG. 7 shows an exemplary strand tensioner 50. This particular strand tensioner includes a hydraulic cylinder 52 with an extending/retracting rod 56. Coupler 48 is provided on the free end of the rod. The coupler in this example includes a female threaded hole configured to engage an individual loading stud 24. The coupler is threaded over the loading stud and a rotation-limiting device is then preferably applied. Exemplary rotation-limiting devices include a jam nut, a cross-pin, and aviation safety wire. The term "coupler" should be read broadly to include any device able to transmit tension from a strand tensioner to a strand termination, and may include hooks, brackets, and many other types of devices.

The rotation limiting device prevents rotation between coupler 48 and loading stud 24 once the coupler is firmly attached to the loading stud. It is also preferable to limit rotation between rod 56 and cylinder 52. A keyway may be used to rotationally lock the rod and cylinder together. Mount 54 is provided to attach strand tensioner 50 to an external frame. One or more pivots may be provided on mount 54 so that the angle of strand tensioner 50 may be made adjustable. Appropriate hydraulic connections are provided so that hydraulic pressure may be used to extend and retract rod 56—if desired.

In a preferred embodiment, strand tensioners 50 could be viewed as "passive" devices. In this embodiment, the hydraulic lines leading from each strand tensioner 50 are fed into a common, pressurized reservoir. The reservoir can be contained within pressure controller/sensor 60 (see FIG. 13). Returning to FIG. 7, the hydraulic cylinders within each strand tensioner 50 are double-acting cylinders for this example. The piston within each of these double-acting cylinders is preferably placed near the mid-point of its range of travel (midway between the two illustrated fluid ports).

One could "plumb" the cylinders in different ways. Those skilled in the art will know that double-acting hydraulic cylinders typically have two hydraulic ports—one on each extreme of the piston's range of travel. The port that is used for the "retract" stroke (causing the rod to retract into the cylinder) is generally located near the rod end of the hydraulic cylinder. All the hydraulic lines leading from the retract ports in this example are connected to a common, pressurized hydraulic reservoir.

Returning to FIG. 13, when the one or more hydraulic cylinders 72 are pressurized to begin moving the fixture 64 and the strand tensioners 50 to the right (in the orientation of FIG. 13), the tension on the cable tends to pull the rods out of the hydraulic cylinders in the strand tensioners 50. This motion pressurizes the retract port on each of the cylinders within strand tensioners 50. In this embodiment, of course, all the retract ports are connected to a common, pressurized hydraulic reservoir. As a result, the same pressure winds up being applied to each retract port.

The result is that the tension being applied to each individual stand must be equalized and the motion of the rods within the strand tensioners 50 ensures that this is the case without the need for any sophisticated active control. A simple operational example will make this point clear. One of the strands in the assembly will draw taut first and this fact will cause the rod in the strand tensioner attached to that particular strand to start moving out of its cylinder. This will displace hydraulic fluid within that strand tensioner and cause that hydraulic fluid to be expelled out the retract port on the particular strand tensioner. The common reservoir is pressurized, so expelling fluid from one cylinder causes the same volume of fluid to be discharged into the other cylinders. As a result, the rods in the other strand tensioners 50 actually retract a small distance until their attached strands draw taut.

Similar "equalization" displacements take place among all twelve strand tensioners 50. Some rods will extend outward through a small displacement stroke, other rods will retract through a small displacement stroke, and likely still others will not move much at all. This is why it is a good idea to start the process with the pistons in the hydraulic cylinders within the strand tensioners near the middle of their range of travel, rather than at an extreme. The result is that by moving fixture 64 through a small displacement all strand tensioners 50 wind up with an equal amount of internal pressure in the hydraulic cylinders and all the connected strands wind up with the same amount of tension.

Returning now to FIG. 7, displacement sensor 64 may be provided to monitor the motion of the rod during the tensioning process. The tension actually being applied can be monitored by monitoring the hydraulic pressure applied to the cylinder.

Returning now to FIG. 13, some exemplary operations of the components will be described. This example is applying tension to a 12-strand cable. Thus, fixture 64 must provide mounting attachment points for twelve strand tensioners 50. As may be seen, each strand tensioner is preferably mounted so that it will be parallel to the strand termination it will be connected to. Fixture 64 preferably includes features allowing the mounting position of each strand tensioner to be adjusted as desired, though some embodiments may include fixed positions. The result in this example is a radial pattern of diverging strand tensioners. Several space frames 66 are positioned to keep fixtures 58 and 64 in position so that the substantial tensile forces applied to the strands do not distort the assembly.

In some embodiments the strand tensioners may be remotely located, with the connection to the strand terminations being made with cables passing over pulleys. Other embodiments might use levers or other remote-mounting mechanisms. Thus, the construction shown is properly viewed as exemplary.

Pressure controller/sensor 60 provides hydraulic pressure to each of the twelve strand tensioners. In many instances the same pressure will be fed to all tensioners, since this will ultimately produce a uniform tension among the strands. If a common pressure is desired, the prior example of simply plumbing all the retract ports on all the cylinders within strand tensioners 50 to a common, pressurized reservoir may be used. However, in other instances it will be desirable to vary the pressure applied to each tensioner. Thus, pressure controller 60 may be configured to independently apply pressure to each cylinder and to monitor and maintain a selected pressure for each cylinder. This may be desirable for cable lay constructions, where a higher tension may be applied to the inner strands than the outer strands.

Process controller 62 preferably receives information regarding the translation of each cable strand (via an input such as displacement sensor 64) and the tension applied to each strand. Strand tension may be derived from the pressure applied to each strand tensioner or via some other source—such as a load cell or strain gage placed on the strand termination or on the strand tensioner.

In a representative pre-load operation, pressure would be applied to one or more hydraulic cylinders 72 to pull the slack out of the cable and apply increasing tension. Hydraulic pressure will then be created within the strand tensioners 50 as the load is transferred from fixture 64 to cable 10. In a simple version, a slow "ramp up" of even hydraulic pressure could be applied by the one or more hydraulic cylinders 72. If the overall concept is to apply a balanced load among all the strands, then applying uniform pressure to all the cylinders will cause some loading studs 24 to be pulled further through collector 34 than others (since the longer strands will still have more slack needing to be pulled out, in this example).

Once a uniform tension in all strands has been achieved and the desired total tension has been achieved, the relative position between each strand termination and the collector should be locked in place so that the strands don't shift significantly when the pre-load is removed. Any suitable locking mechanism can be used. For the example of FIG. 6, one would simply apply a uniform amount of torque to each of the nuts 40 while the strand tensioners 50 maintain tension on the strands.

More generally, the invention seeks to preserve the proper spatial relationship between each strand termination and the collector, so that the proper relationship can be recreated when the cable is put into use. One way to preserve this relationship is mechanically locking the strand terminations in the position determined to be correct during the preloading process. There are certainly other ways, however. One could, for example, accurately measure and record the spatial relationship between each strand termination and the collector without mechanically locking the strand terminations in position. Later, the correct spatial relationship would be recreated by adjusting each strand termination until it repeated the previously taken measurements. This could be done with the same collector used in the pre-load process. It could also be done with another substitute collector. For example, the collector used in the pre-load process might be a modular assembly intended only for the taking of accurate measurements and not for field use. It might be equipped with expensive position sensors that one would not wish to install in the field.

As stated previously, cables using synthetic filaments tend to have relatively little surface friction. Thus, if one does not load a stranded termination carefully it is possible for one strand to slip relative to the others in a direction that is roughly parallel to the cable's central axis (a "longitudinal slip"). Once such a slip occurs it is difficult to detect and in many instances impossible or impractical to correct. As an example, a particular cable might be 100 meters in length. A longitudinal slip can occur anywhere along the cable's length where there is an imbalance in tension. Such a slip is not generally an issue within the cable itself. However, a slip near one of the cable's terminated ends can be a significant problem. The slip produces a localized disturbance in the cable's structure. This will nearly always cause a weakness at the point of the slip and an overall reduction in the cable's breaking strength. Even if one balances the strand tensions at the ends of the cable after such a slip, the internal disturbance in the cable's structure will compromise its performance. Perhaps more significantly, the compromise in performance may not be detectable without actually testing the cable to the breaking point.

So long as the strands are initially loaded in a controlled manner, holding the tension on the individual strands reasonably even, the region where the strands transition from the free cable structure to the collector should stay reasonably balanced. The goal is primarily the prevention of a slip. The approach is to carefully control and regulate the tension applied to each individual strand so that no significant imbalance occurs. In the absence of an imbalance a slip is unlikely.

In an open-loop embodiment of the inventive process, one can apply a stepped increase in tension. For example, one may apply a tensile load of 1% of the anticipated ultimate break strength, check for the tension of the strands, then move up to a 5% load, recheck, then move up to a 10% load, and so on. Automated strand adjustment can allow for continuous tension to be maintained on the cable.

Consistency and repeatability are very important in the cable industry—particularly where the cables carry large loads. The present invention seeks to pre-load the cable and adjust each strand termination to the appropriate spatial relationship with the collector without producing a longitudinal slip. In a closed-loop embodiment, strand tension and/or position can be monitored and fed to a process controller that automatically adjusts the tension applied to each strand. The loading process is preferably modified in real time in the event that unwanted slippage is detected.

The reader should understand that some minimal slippage is inherent in the preloading process. It can likely never be eliminated altogether. But, it is possible by using the present invention to eliminate large-scale damaging slips. One approach is to simultaneously apply tension through all twelve of the loading studs shown in FIG. 6 and to apply that tension in a controlled fashion.

It is generally important to control the rotation of the strand during loading. Since the strand itself almost always has some type of twisted construction (such as braided or wound) rotation is highly related to tension. Thus, it is preferable to apply tension to a strand without allowing it to rotate. Further, once the tensioning process is complete, it is preferable to limit rotation between the strand and the collector. Otherwise the strand may "unwind" itself.

In an exemplary implementation of the closed-loop embodiment, a strand tensioner 50 (as described previously) is provided for each strand in a cable. FIG. 13 illustrates one possible fixturing arrangement. The reader will recall that collector 34 is simply held in place during the tensioning process. The strands pass through the collector but should not transfer any significant forces to the collector as the strand tensioners go to work. Process controller 62 preferably receives information regarding the translation of each cable strand (via an input such as displacement sensor 64) and the tension applied to each strand. Strand tension may be derived from the pressure applied to each hydraulic cylinder or via some other source—such as a load cell or strain gage placed on the strand termination or on the strand tensioner.

In the closed-loop embodiments, process controller 62 ideally includes a processor running a control program. This allows a prescribed "ramp up" of strand tension. However, the process need not be a fixed one but is more preferably an adaptive process that changes according to the sensor values. FIGS. 9-12 illustrate several examples of operation for the device of FIG. 8. The reader should bear in mind, however, that the operational configurations are virtually limitless and so the examples provided should not be viewed as limiting.

Figure 9:
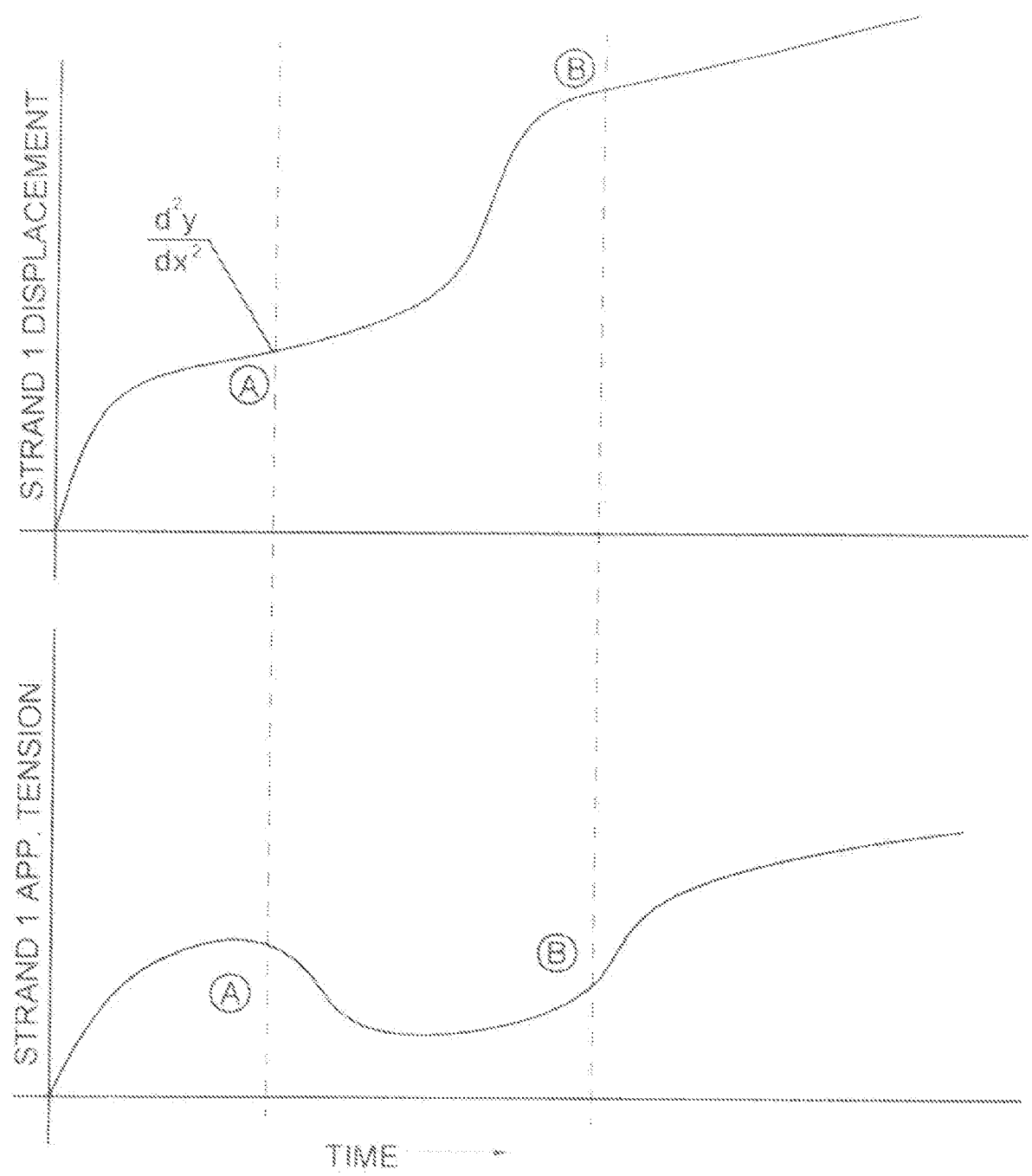
FIG. 9 is a plot of strand displacement and applied tension over time.

FIG. 9 shows an example where tension is steadily raised on all strands at the same time (though only a single strand is plotted). The upper plot shows the linear displacement of the termination affixed to "Strand 1." The lower plot shows the tension applied to the same "Strand 1."

The first part of the curve is non-linear and represents the initial removal of slack. Once the slack is removed, displacement is roughly a linear function of applied tension. This continues up through Point A. At point A, Strand 1 experiences a significant longitudinal slip. The rate of displacement suddenly increases in a non-linear fashion. At the same instant the tension applied actually falls (Point A' on the lower plot). The decrease in tension results from the fact that the strand-to-strand friction has transitioned from a static mode to a dynamic mode.

The substantial slip continues until Point B, when Strand 1 stops slipping with respect to its neighbors and resumes elastic elongation. At this point the tension in Strand 1 also returns to a linear relationship (Point B' in the lower plot). FIG. 9 represents an "open loop" scenario where tension is ramped up at a fixed rate and no slip detection is included.

However, it may be possible to detect and prevent significant longitudinal slips using the information available in FIG. 9. The slope of the displacement curve (dy/dx) should remain fairly constant in the absence of a significant slip. By monitoring the rate of change of this slope ($d^2y/dx^2$) the control system can detect a sudden slope increase—which strongly suggests the onset of a slip.

Figure 10:
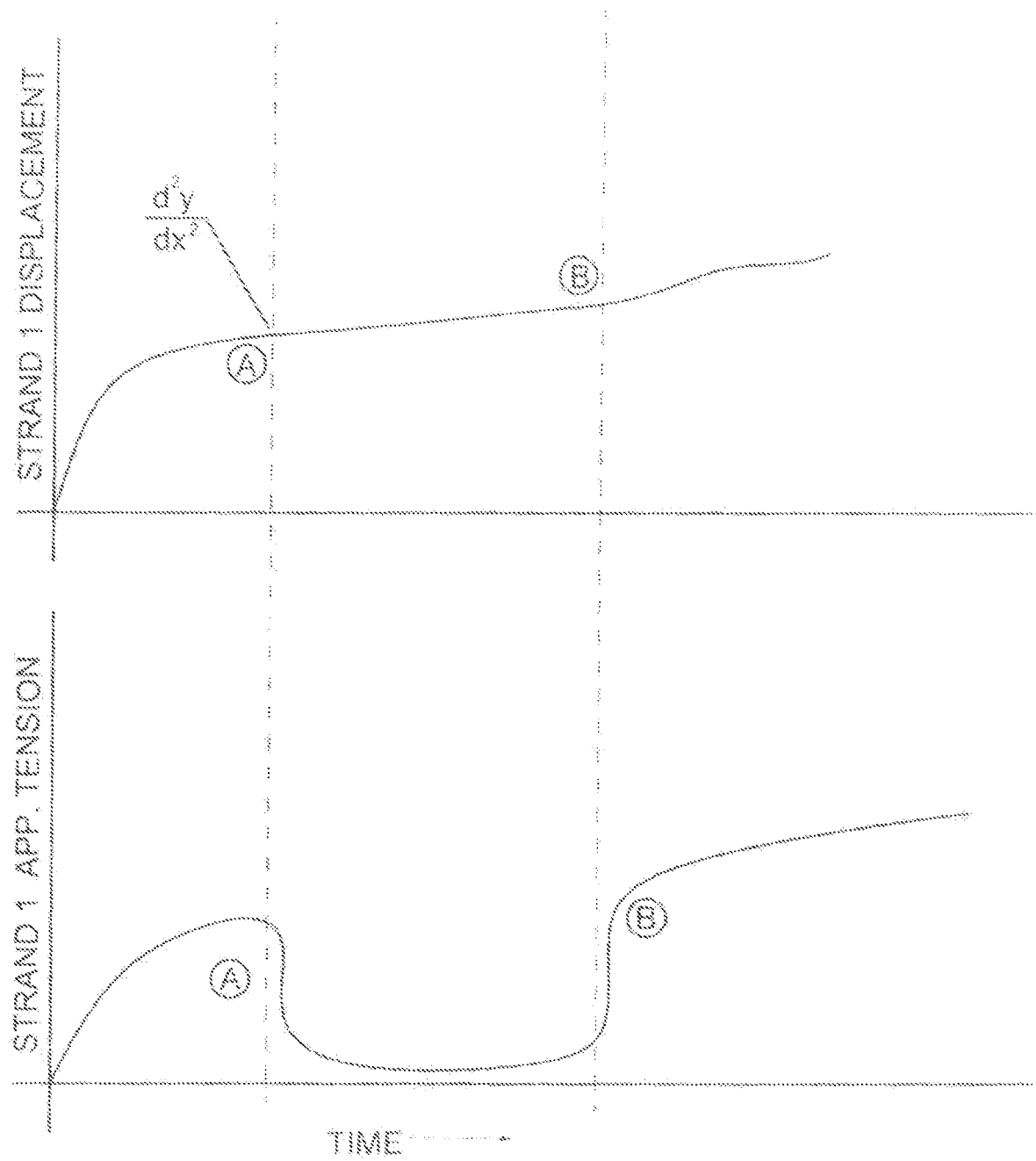
FIG. 10 is a plot of strand displacement and applied tension over time.

FIG. 10 illustrates this scenario. At Point A in the upper plot process controller 62 detects the onset of a potentially damaging slip. The controller immediately reduces the applied tension on Strand 1 (see lower plot) so that a smooth displacement is maintained. Tension continues to be ramped up on the other strands within the cable. The increase in tension on the other strands will tend to "re-clench" the previously slipping Strand 1 (recall the complex braided structure shown in FIG. 1).

Once the controller determines that the slip is under control (such as by monitoring the rate of change of the displacement plot slope, among other methods) tension on Strand 1 is ramped back up (shown as Points B and B'). A normal increase is then continued unless another slip is detected.

In some instances a slip may occur so quickly that the tensioning apparatus cannot respond rapidly enough. In those cases the best approach will be to regulate the tension applied to each strand in such a fashion as to prevent the slip to begin with. If the displacement sensors then detect a slip, this information may still be useful because it informs the operator that the cable contains a significant defect and it may no longer be possible to use it in its intended application.

Figure 11:
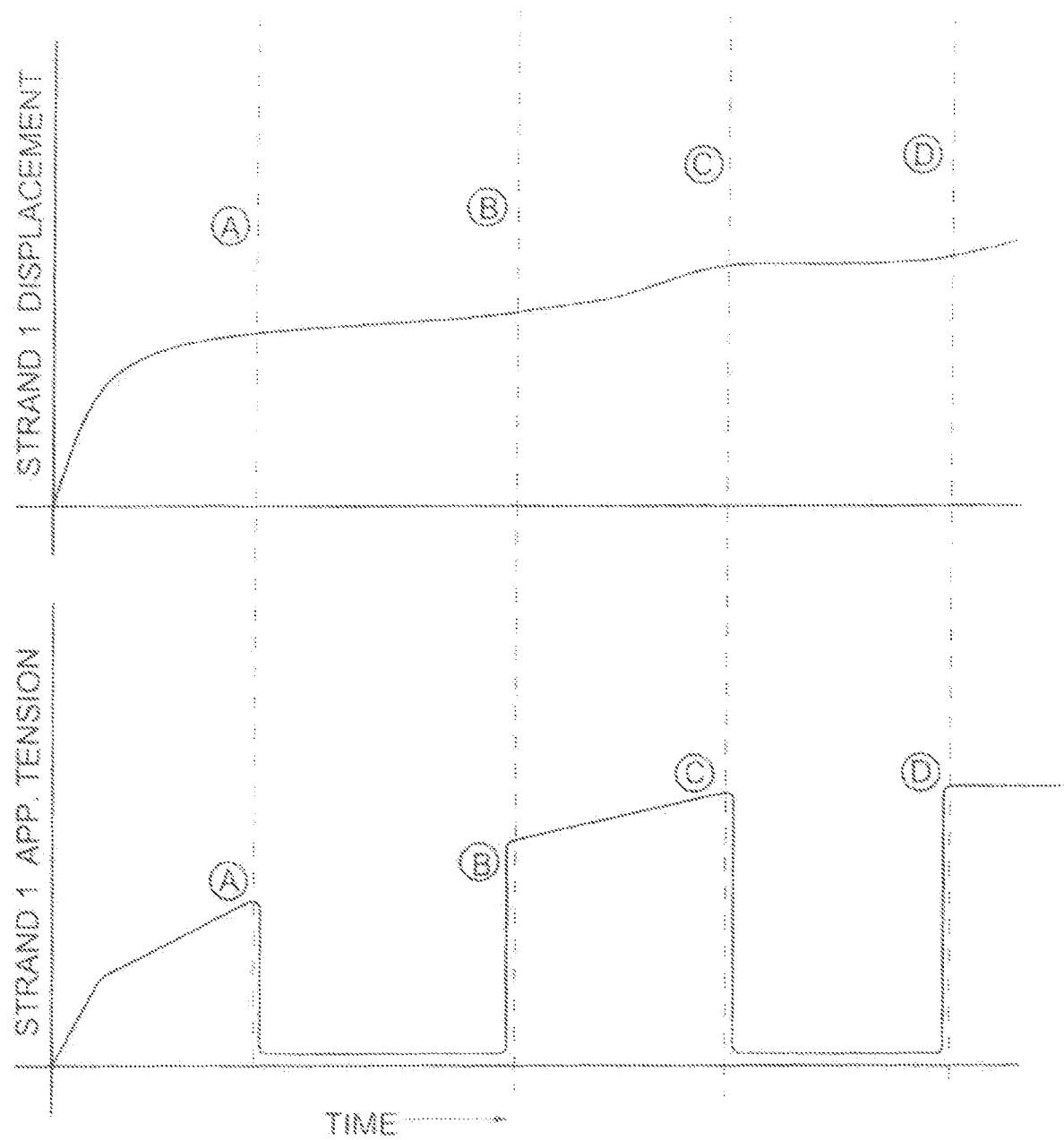
FIG. 11 is a plot of strand displacement and applied tension over time.

Of course, there are many tension-increasing profiles that are non-linear. In some cable constructions it is advantageous to pulse the application of tension. FIG. 11 shows a plot depicting this type of "ramp up." Again, the plot shows only one strand in a 12-strand cable, but the plots for the other eleven strands would be similar (in the absence of a slip). Slack is removed and tension is ramped up until Point A. Tension is then stepped down to a low level and a low-tension interval (from Point A to Point B) is maintained so that the cable structure can stabilize.

At Point B tension is again applied and increased. Another "rest" interval commences at Point C and continues to Point D. This process continues until a desired amount of pre-load has been applied to the cable.

Figure 12:
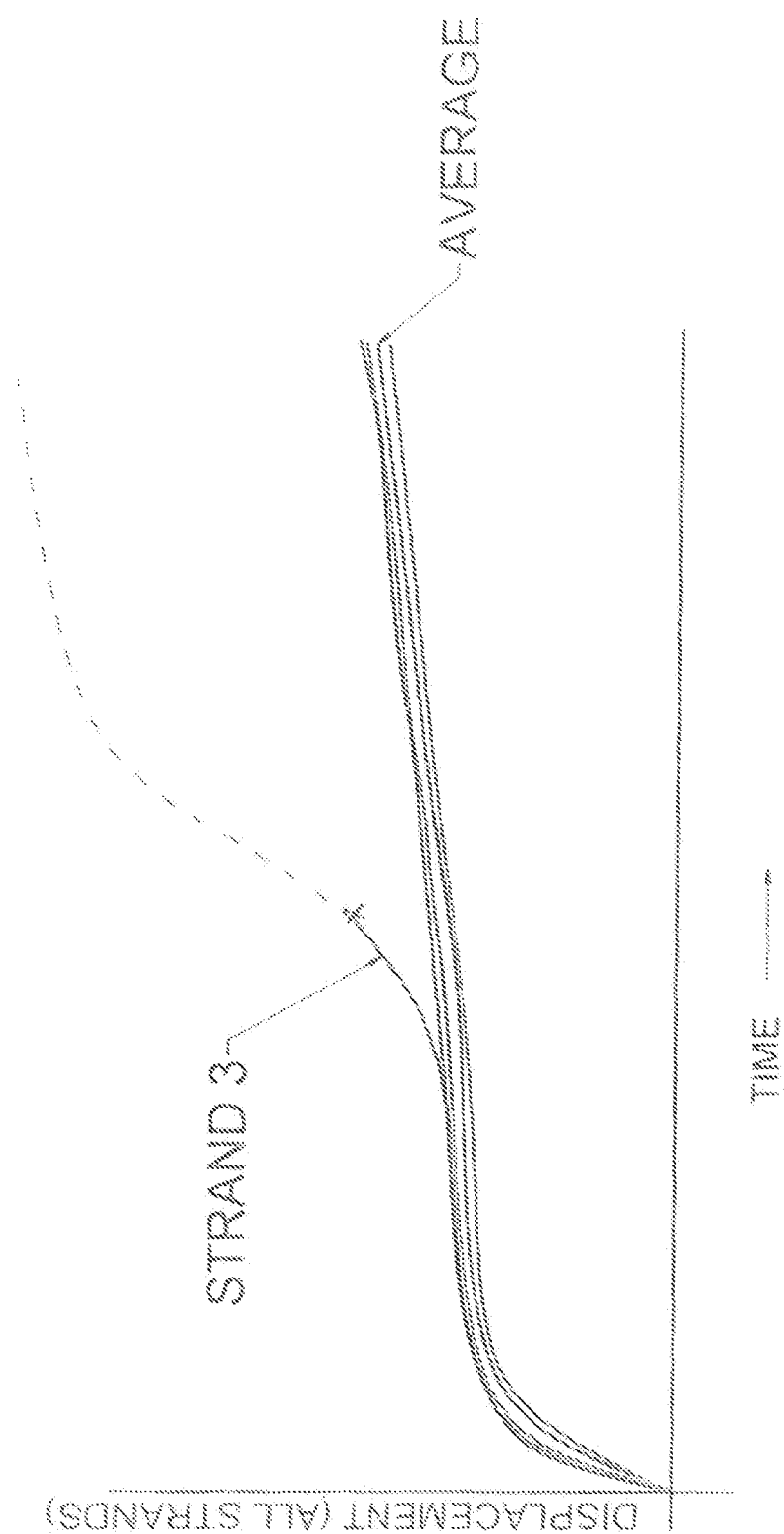
FIG. 12 is a plot of strand displacement over time for multiple strands.

FIG. 12 shows a combined plot of displacement versus time for all twelve strands in a 12-strand braided cable. The process controller typically measures and compares the values for all the cable strands as the tensioning process proceeds. Another effective slip detection method is to "scan" for one strand passing too far outside the average for all the strands. In the plot of FIG. 12 one strand (Strand 3) has experienced a substantial longitudinal slip and its displacement has suddenly progressed rapidly beyond that of the other strands. When this condition is detected the controller can reduce the tension on Strand 3 and allow the cable to stabilize as the tension on the other strands is increased.

Figure 8:
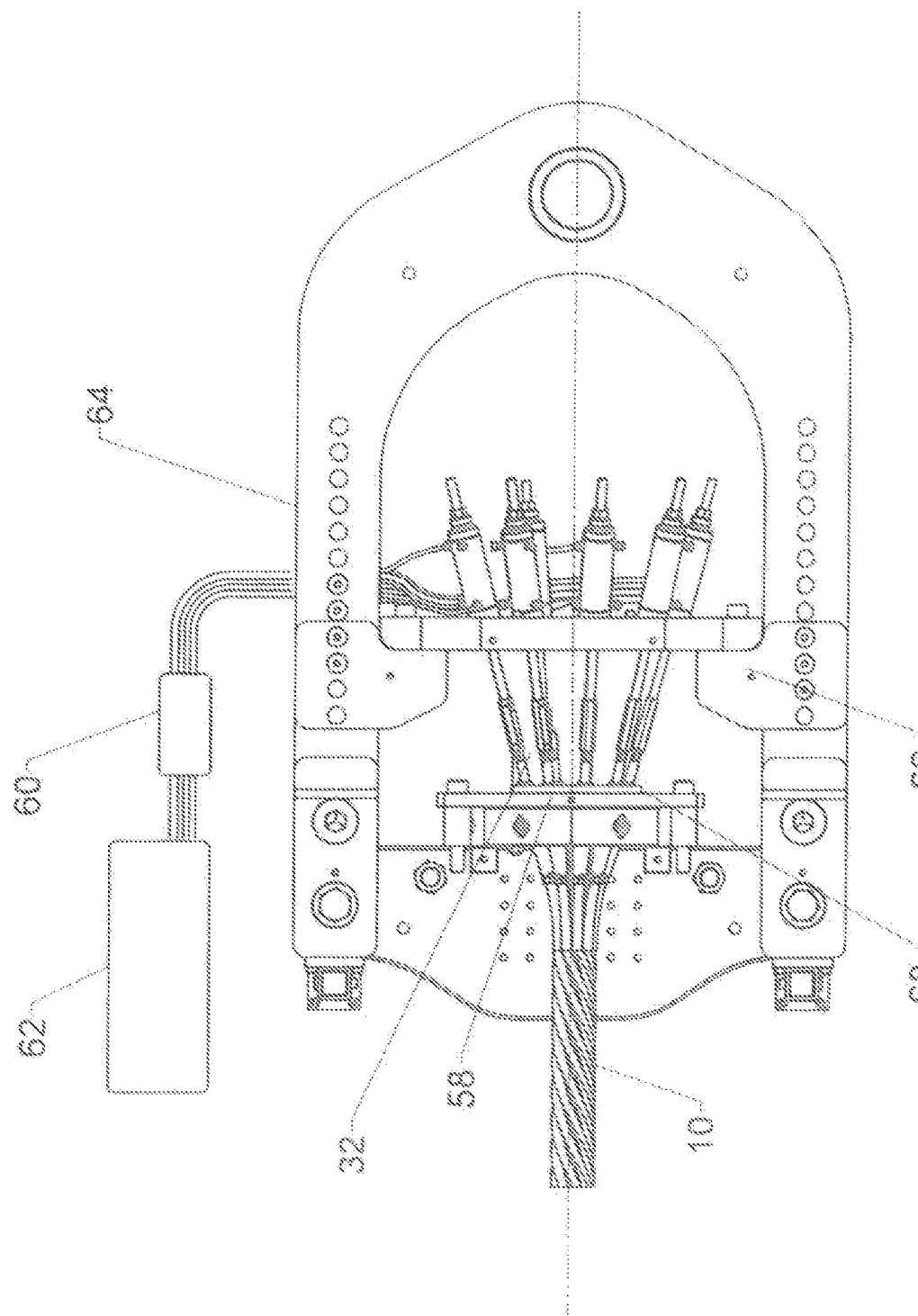
FIG. 8 is a side elevation view, showing an assembly used to apply loads to all the strands in a cable assembly in a controlled fashion.

FIG. 8 shows a simplified alternate tensioning fixture. In this embodiment fixture 58 and fixture 64 are stationary. Tension is applied to the far end of the cable using another fixture, or some other means such as by rotating a capstan around which the cable is wound. As described for the embodiment of FIG. 13, the tension on the individual strands is regulated and adjusted using the individual strand tensioners 50. It may be regulated via connecting them to a common, pressurized reservoir, or via an active control approach.

Figure 15:
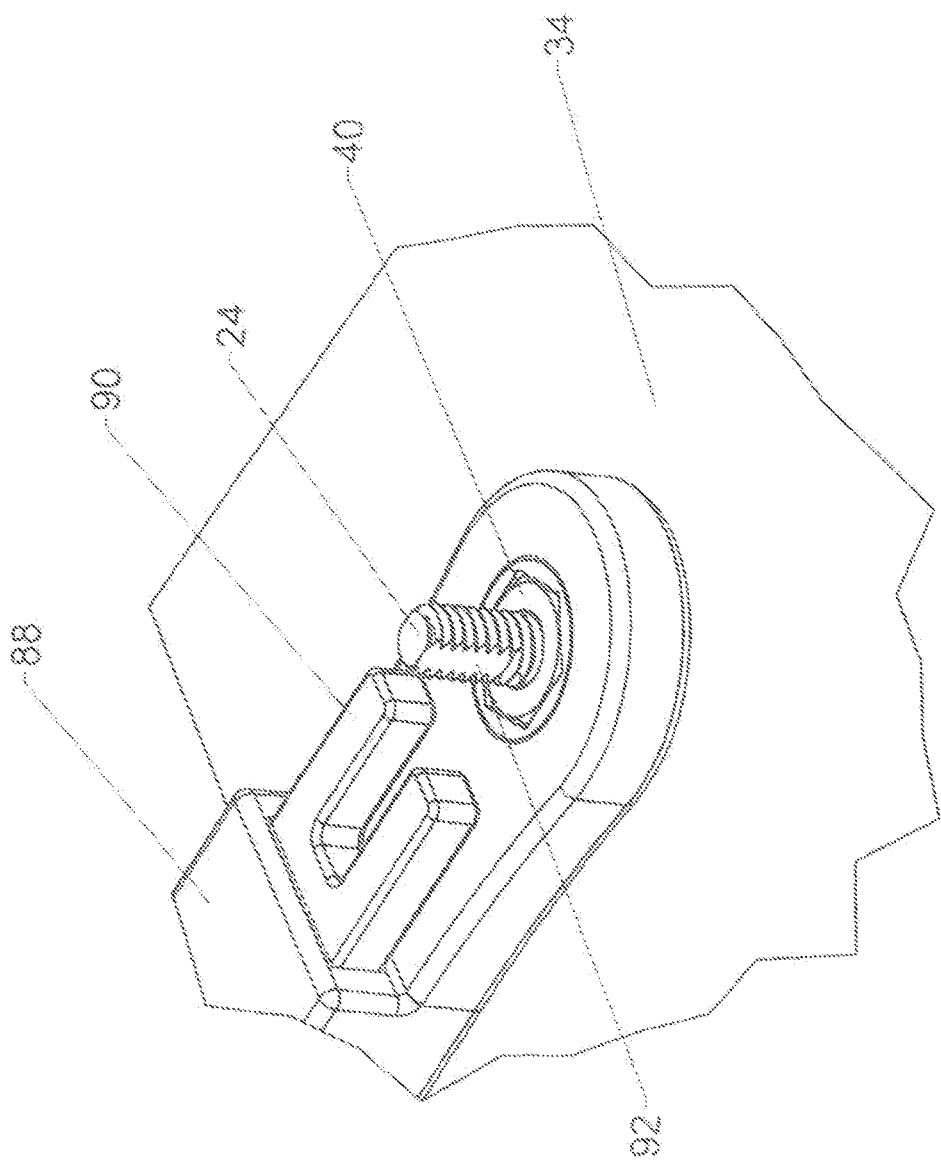
FIG. 15 is a detailed perspective view, showing an alternate embodiment for a strand tensioner.
Figure 16:
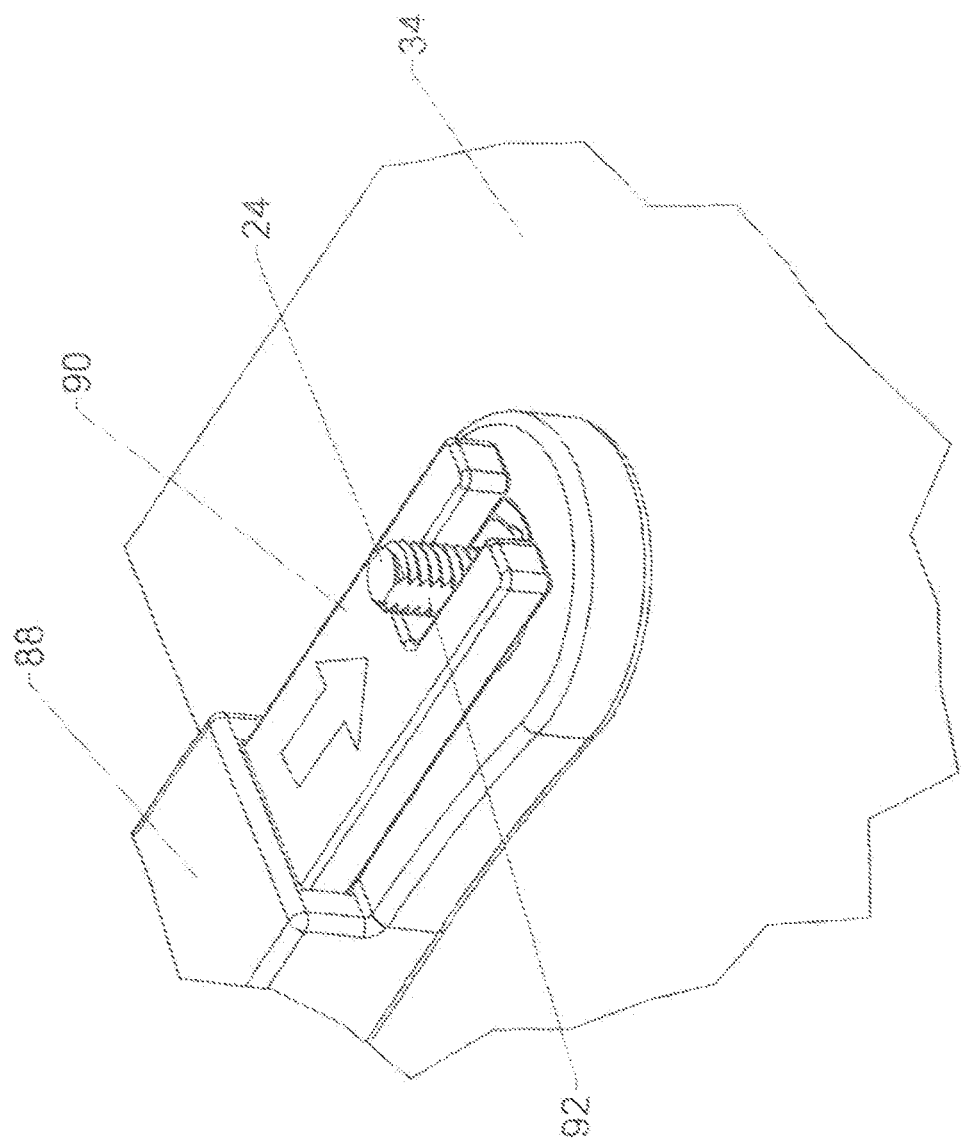
FIG. 16 is a detailed perspective view, showing an alternate embodiment for a strand tensioner.

Of course, other automated tensioners could be substituted for the hydraulic cylinder shown in FIG. 7. FIGS. 15 and 16 show one embodiment for such as device. Strand tensioner 88 slips over nut 40. An electrically-activated gear drive within strand tensioner 88 engages and turns nut 40 while the stand tensioner 88 remains in the position shown.

It is preferable to secure loading stud 24 so that it does not turn with the nut. A pair of opposing flats 92 are provided on loading stud 24. Telescoping clevis 90 is part of strand tensioner 88. This component includes a clevis notch sized to engage the two flats on the loading stud. FIG. 16 shows telescoping clevis 90 in an activated state. It engages the two flats 92 and prevents the rotation of loading stud 24. In this configuration, the gear drive within strand tensioner 88 rotates nut 44 and thereby increases or decreases the tension on the strand to which loading stud 24 is attached. The control of strand tensioner 88 may be manual. On the other hand, strand tension 88 may be substituted for strand tensioner 50 in the embodiment of FIG. 13. In that case, strand tensioner 88 could be controlled by process controller 62.

Figure 17:
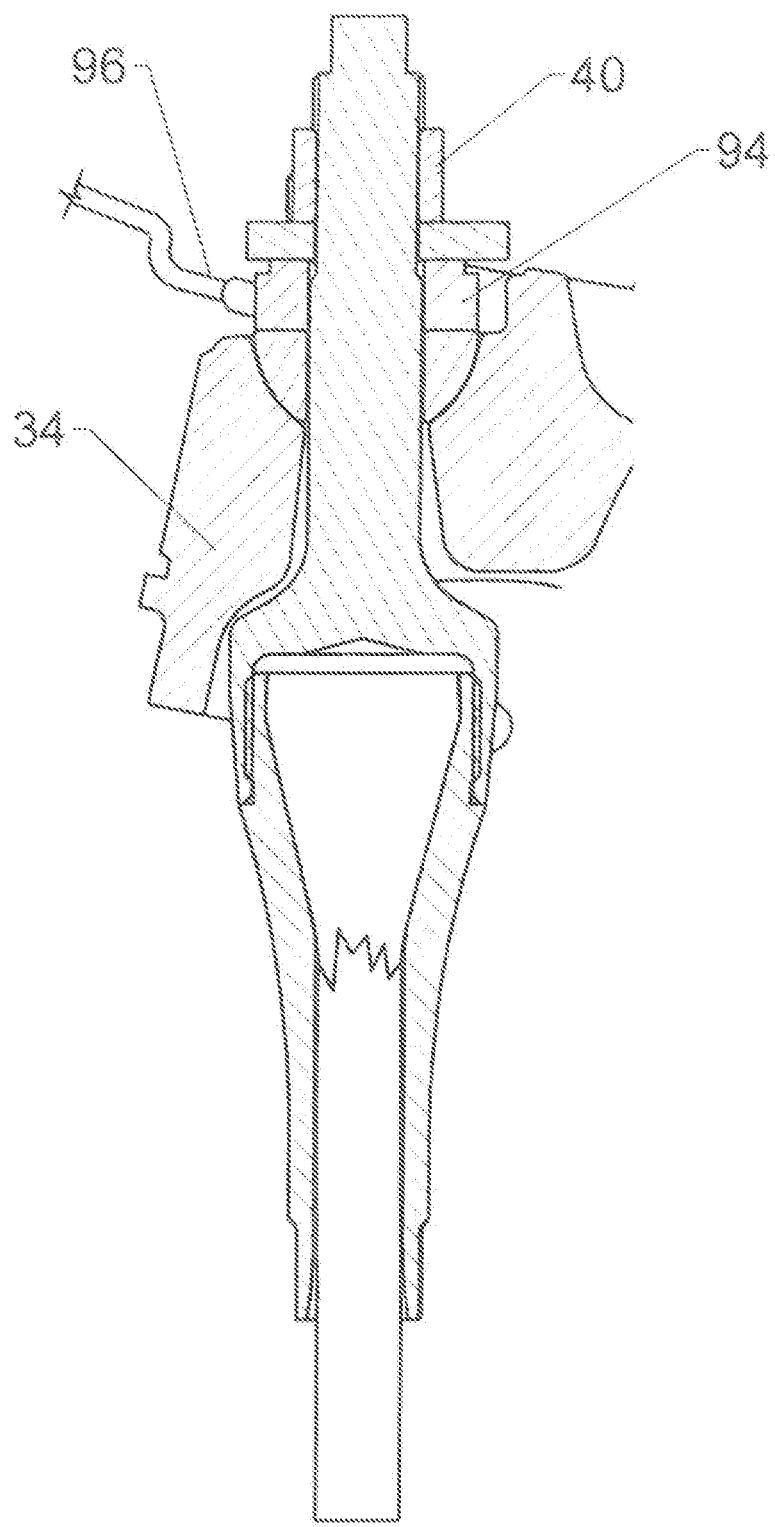
FIG. 17 is a sectional elevation view, showing the use of a load cell to monitor individual strand loading.

FIG. 17 illustrates a substitute sensing method that could be used for virtually any embodiment. In this version, the conventional washer between nut 40 and collector 34 has been replaced by load cell 94. This load cell is provided with wiring 96 to connect it to a remote sensor monitor or possibly the process controller itself. Using this load cell the tension on each strand may be monitored. The wired connection could be replaced by a wireless one having an internal battery with enough energy to last through the preloading process. It could even be made rechargeable in order to be useful for load monitoring in the field.

Those skilled in the art will appreciate that many other devices and methods could be used in place of the embodiments described. For example:

1. The displacement sensor on the hydraulic cylinders could be replaced by an optical system that uses light to measure the displacement of each loading stud;

2. The pressure sensors in the hydraulic system could be replaced with direct load sensors—such as load cells or strain gages;

3. The threaded connection between the strand tensioner and the loading stud could be replaced with a different type of connection; and 4. Pulsed hydraulic force could be applied to the tensioning process rather than a smooth "ramp up."

Figure 14:
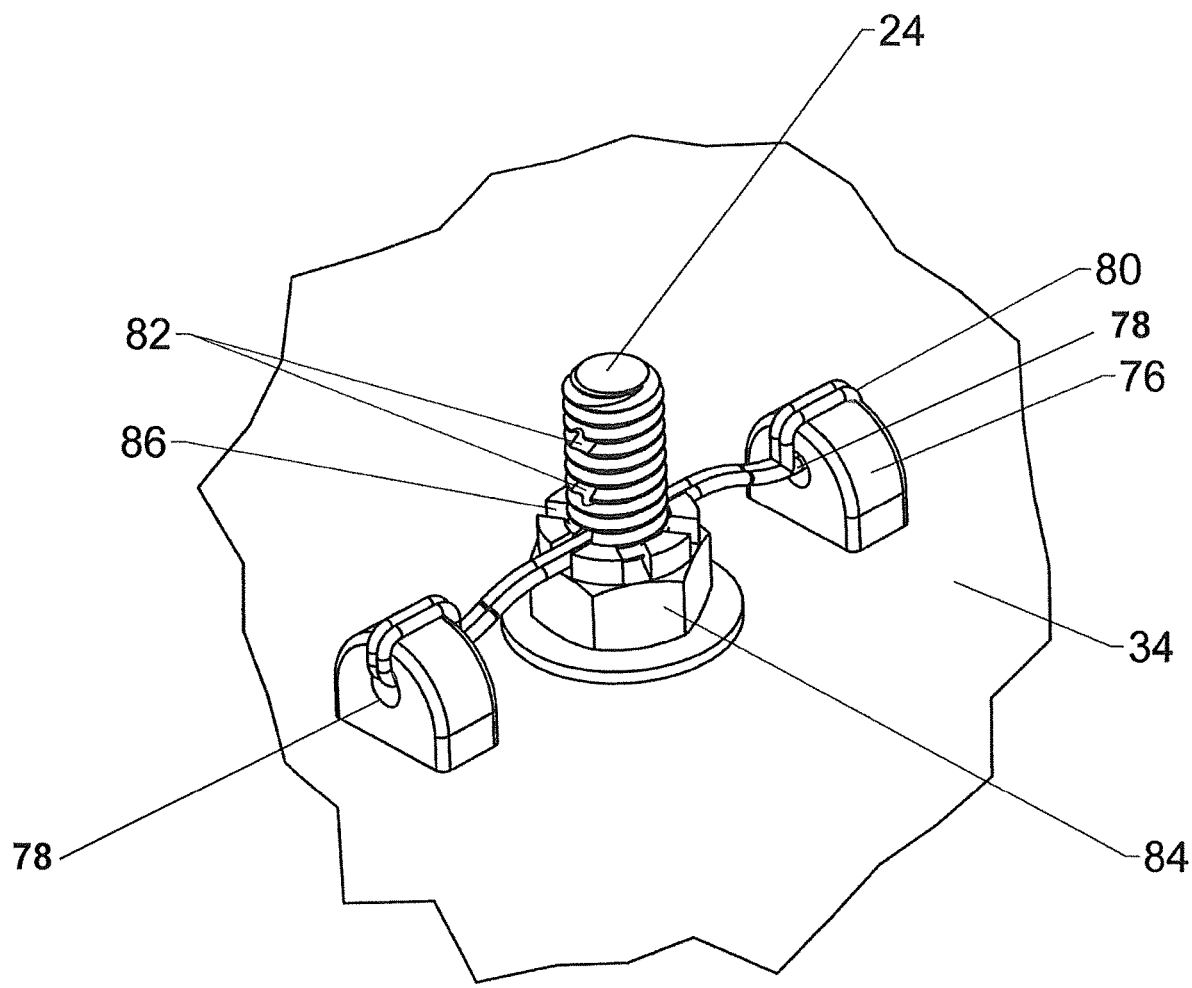
FIG. 14 is a detailed perspective view, showing a rotation-limiting feature.

Once a controlled and monitored pre-load has been applied to the cable, it is desirable to stabilize the position of the strand terminations with respect to the collector. Obviously the cable is not useful while locked into the fixture of FIG. 8. One way to transition to the completed product is to hold the final tension within the fixture of FIG. 13 and advance nuts 40 to a tightened position with a specified amount of torque. Once a suitable balance is achieved, the geometric relationship between the strand terminations and the collector is preferably secured so that the "relaxation" of the cable won't allow disorganization to resume. There are many, many ways to secure this geometric relationship. FIG. 14 depicts another way this could be done. Castellated nut 84 is used in the place of a conventional nut. The castellated nut is tightened against collector 34 to secure loading stud 24 in place. Two proximate bosses 76 with associated holes 78 are provided on collector 34. Once the castellated nut is in position, lock wire 80 is passed around one boss, through a suitable cross hole 82 in loading stud 24 (and through two of the notches 86 on the castellated nut) and around the other boss. Using such a device the rotation of the loading stud is limited and the rotation of the castellated nut is limited.

The strand tensioners are then released and the cable can be removed from the fixture and prepared for use. The nuts may be secured in position using other device such as a cottar key, tack welding, or any other suitable method. If desired, the protruding length of loading stud 24 can be removed at that time.

The tightening of the nuts may be done by automated machinery, since it is generally undesirable for a human operator to come near the collector assembly while the strand tensioners are maintaining tension. The amount of force applied is such that a component failure could produce a dangerous condition.

Returning to FIG. 7, those skilled in the art will realize that other components could be used in the place of the threaded engagement between nut 40 and loading stud 24. Once the final tension is applied, a shim of suitable thickness could be placed between a portion of the loading stud and the collector. It is also desirable in some circumstances to clamp the collector from the underside (in the perspective of FIG. 5). A separate shim or fastener can be used for this purpose. Clamping from both sides minimizes the motion of the termination with respect to the collector after the preload has been applied. In still other examples some portion of the strand termination may be tack welded to the collector.

The invention thus described is applicable to any large synthetic cable. It is perhaps most useful for construction where the constituent strands interact in a significant way. This includes cables having a braided construction, or cable lay construction. It also includes cables made using simple helical twists, as well as other constructions. Such cables are said to have an interwoven structure. However, the load-balancing aspects of the invention are potentially useful for all synthetic cables, including those with a purely parallel construction built with parallel strands encased in a wound external jacket.

The invention is also applicable to virtually any defined tensioning plan. The example of FIGS. 10 and 11 are only two among the virtually endless possibilities. Many of the inventive embodiments monitor the amount of tension being applied in the cable through indirect means. An example of this is using the pressure applied to the hydraulic cylinder in the example of FIG. 8. One may easily calculate the applied tension by knowing the pressure. On the other hand, one may simply use pressure as a good proxy for applied tension and base the controlling algorithms directly on pressure. Process controller 62 preferably includes a processor running software that can accommodate these and other variations.

Once the desired strand loading plan has been achieved in the fixture, the appropriate spatial relationship between each of the strand terminations and the collector has been established. The term "spatial relationship" will be understood to mean the relative position of a strand termination with respect to the collector. In some instances this may be a single linear dimension. Looking at the example of FIG. 6, if one omits a ball-and-socket connection and simply passes the loading studs 24 through holes in the collector 34, then adjusting the nuts 40 will adjust one linear dimension. In other examples, however, there may be more than one degree of freedom involved.

Many other variations are possible, including:

1. The "strand tensioner" could assume many forms other than those examples given;

2. The connections between the strand tensioners and the strand terminations could assume many other forms;

3. The collector could be an assembly of multiple pieces that are not joined until the cable is put into use; and 4. The tension monitoring for each strand could be via a wireless transmission from a load cell mounted in each receiver.

The present invention applies a tensioning plan to the strands and allows the individual strands to move in order to determine a geometric relationship between the strands which will produce an even distribution of the m total load among the strands. As explained previously, some strands will move more than others during the application of the tensioning plan. The collector to which the strands are ultimately attached is generally held stationary during this process. The spatial relationship between the strands and the collector is determined while the strands are subjected to the defined tension. One objective of the present invention is to later recreate that spatial relationship when the cable is assembled.

The reader should bear in mind that the tensioning plan will generally involve the application of a significant amount of tension (perhaps 100,000 pounds—400 kN—or more). Thus, while the cable is secured within a fixture such as depicted in FIG. 13 it would not be advisable to send a technician into the area of collector 34 to individually tighten securing devices locking the strands to the collector. It is preferable to measure the spatial relationships between the individual strand terminations and the collector—then later recreate those spatial relationships when the terminations are actually connected to the collector (typically done when the cable is not under tension).

As one can readily imagine, the determination and subsequent recreation of the spatial relationships may be accomplished in a virtually endless variety of ways. It may benefit the reader's understanding, however, to have a detailed explanation of one particular way. Returning to FIG. 7, the reader will recall that an individual strand tensioner 50 is connected to a particular loading stud 24 by threading coupler 48 onto the exposed and threaded end of the loading stud.

Figure 18:
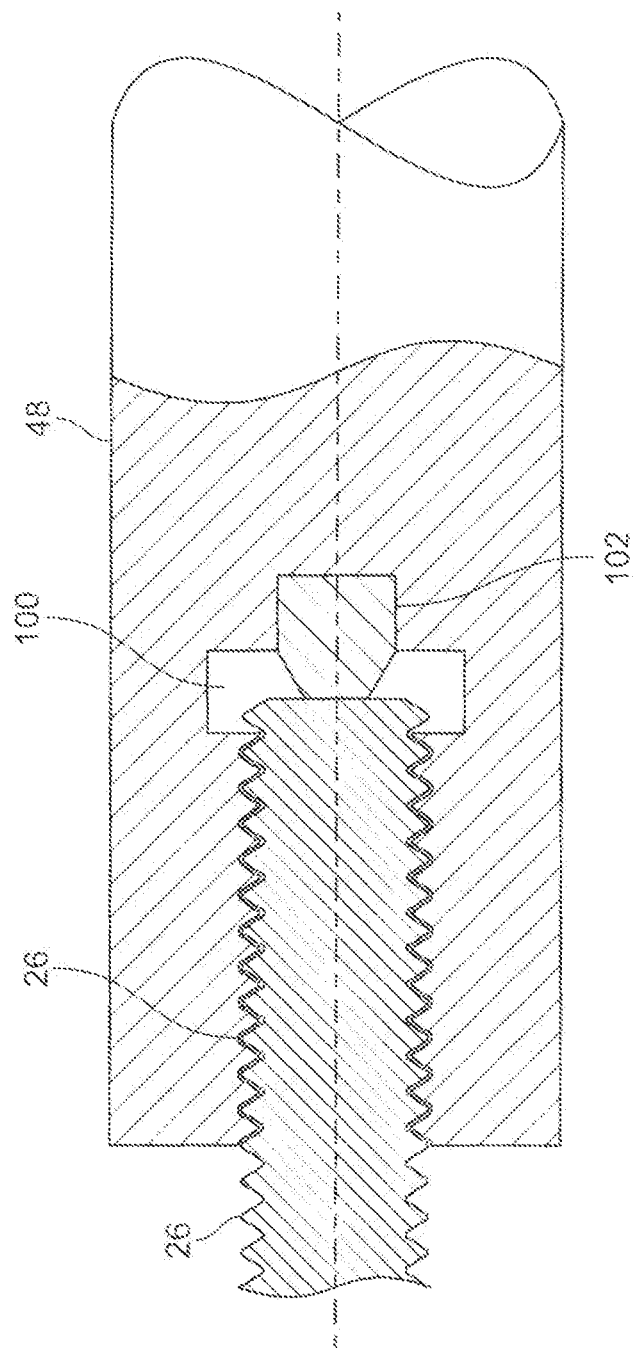
FIG. 18 is a detailed sectional view, showing the engagement of a coupler on a strand tensioner.

In this exemplary displacement measuring scheme, it is important for each stud/coupler to have a precisely defined starting relationship. FIG. 18 provides a sectional view through a particular coupler 48 threaded onto a particular male thread 26 on a loading stud 24. The coupler includes female threaded receiver 98. A relief bore 100 in the blind end of this female threaded receiver includes a hard metal stop insert 102. The stop insert includes a machined flat surface configured to engage the flat surface on the end of the loading stud as shown.

Coupler 48 is threaded onto the loading stud until stop insert 102 firmly abuts the end of the loading stud as shown. Relative rotation between the loading stud and the coupler is preferably eliminated at this point by some type of locking engagement. As an example, a jam nut can be threaded onto the loading stud before the coupler. Once the coupler is in the position shown, the jam nut is unscrewed until it is tightened against the free end of the coupler. This action then locks the loading stud, the jam nut, and the coupler together. Thus locked together, the loading stud and the coupler will move in unison. This fact is important under the exemplary approach, because the linear displacement measurements are actually made from the motion of the coupler and the rod to which it is attached.

Figure 19:
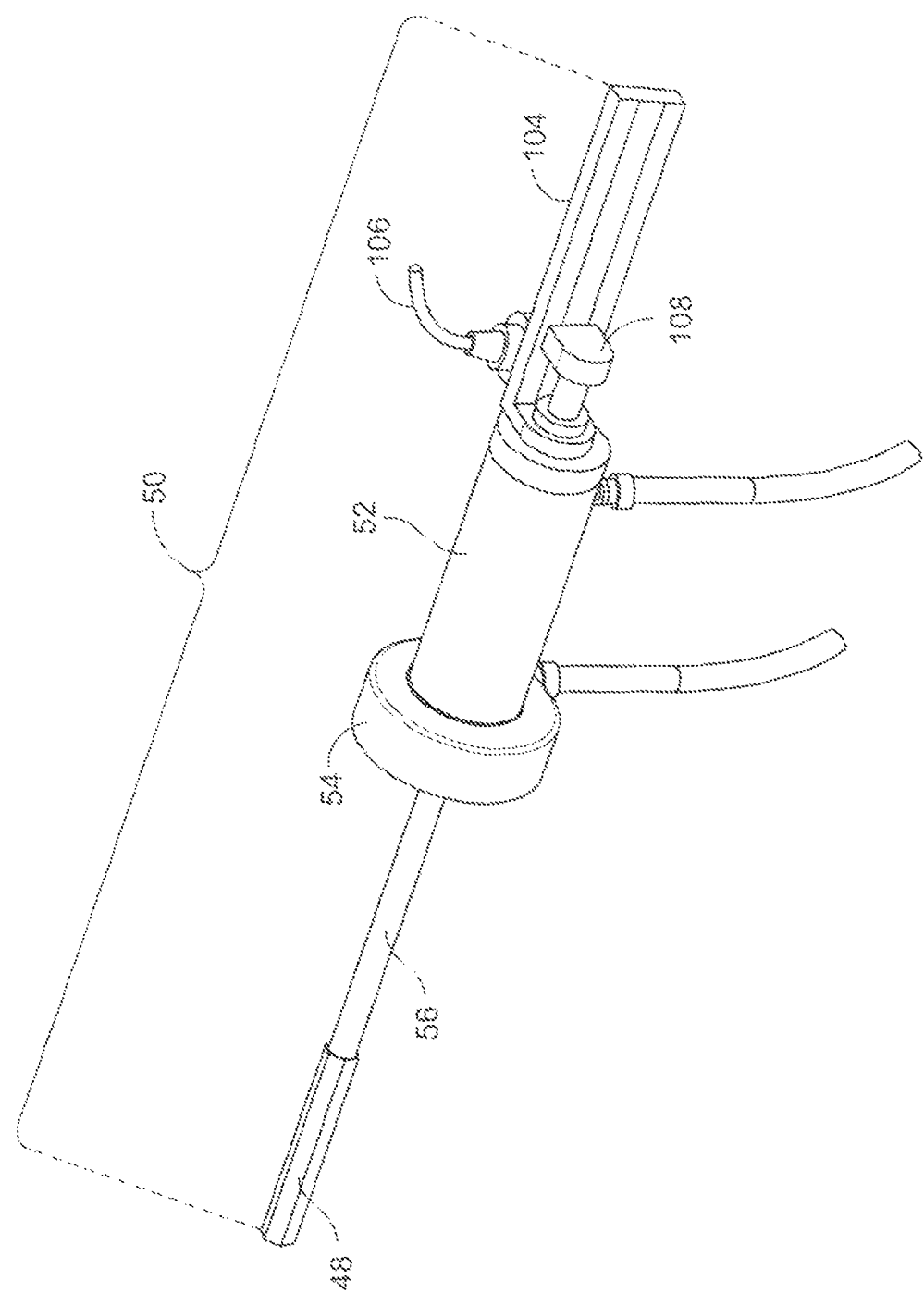
FIG. 19 is a perspective view, showing the addition of a longer linear encoder to a strand tensioner.

FIG. 19 illustrates a strand tensioner 50 that is used in this example. Linear encoder 104 is rigidly attached to cylinder 52 on the opposite side from coupler 48. Rod extension coupling 108 is mounted to the free end of the rod (The rod in this instant protrudes from both ends of the cylinder). Rod extension coupling 108 carries a portion of the linear encoder. As the rod moves, the linear encoder precisely measures its position. This position information is then fed out via digital output 106.

A linear encoder is placed on all the strand tensioners in this example. The data from the linear encoders is fed to the process controller (such as process controller 62 shown in FIG. 13). Thus, the process controller gathers information regarding the linear motion of each cylinder in each strand tensioner.

Figure 20:
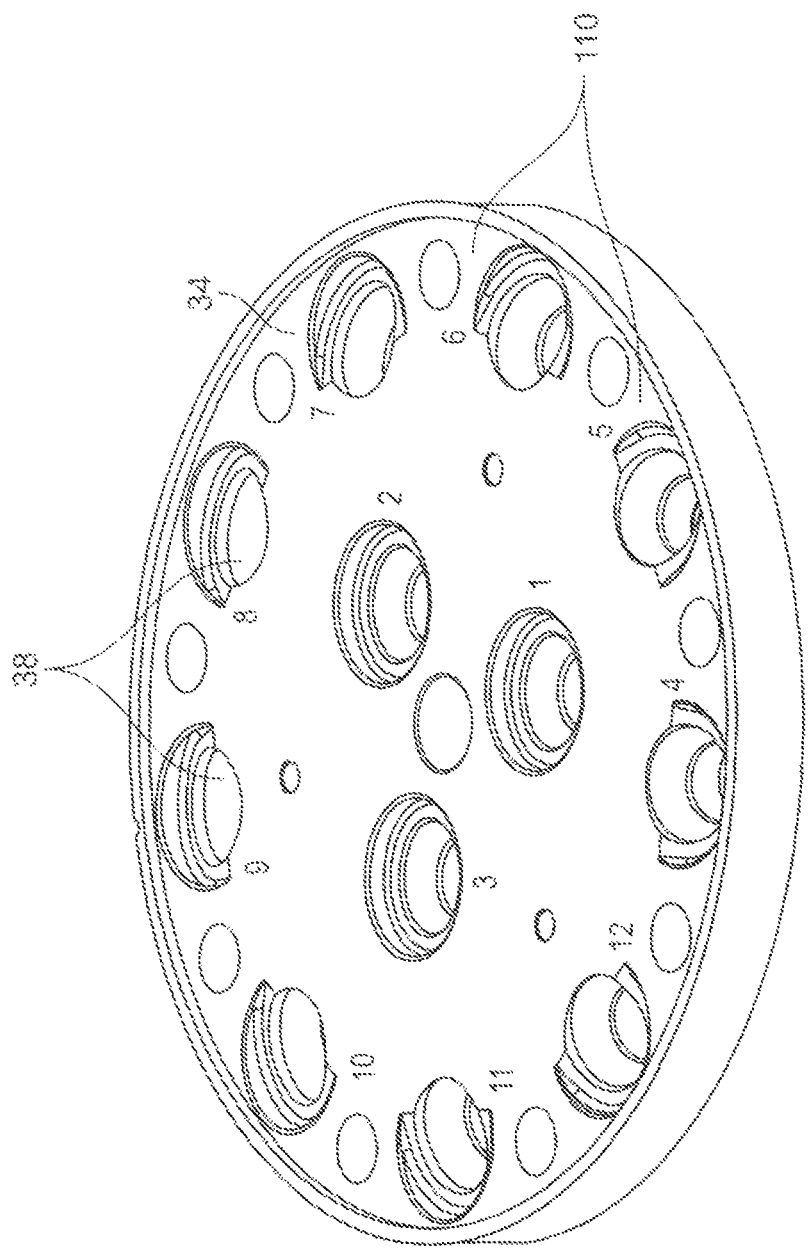
FIG. 20 is a perspective view, showing the addition of reference numerals to a collector.

In this example each individual strand is individually identified. In addition, the receiver where each strand is joined to the collector is also positively identified. FIG. 20 shows a particular collector 34 including twelve receivers 38. Each receiver is configured for the attachment of a termination on an end of a strand. Each receiver includes a reference numeral 110 immediately beside it. This reference numeral indicates which strand should be attached to the particular receiver.

Figure 21:
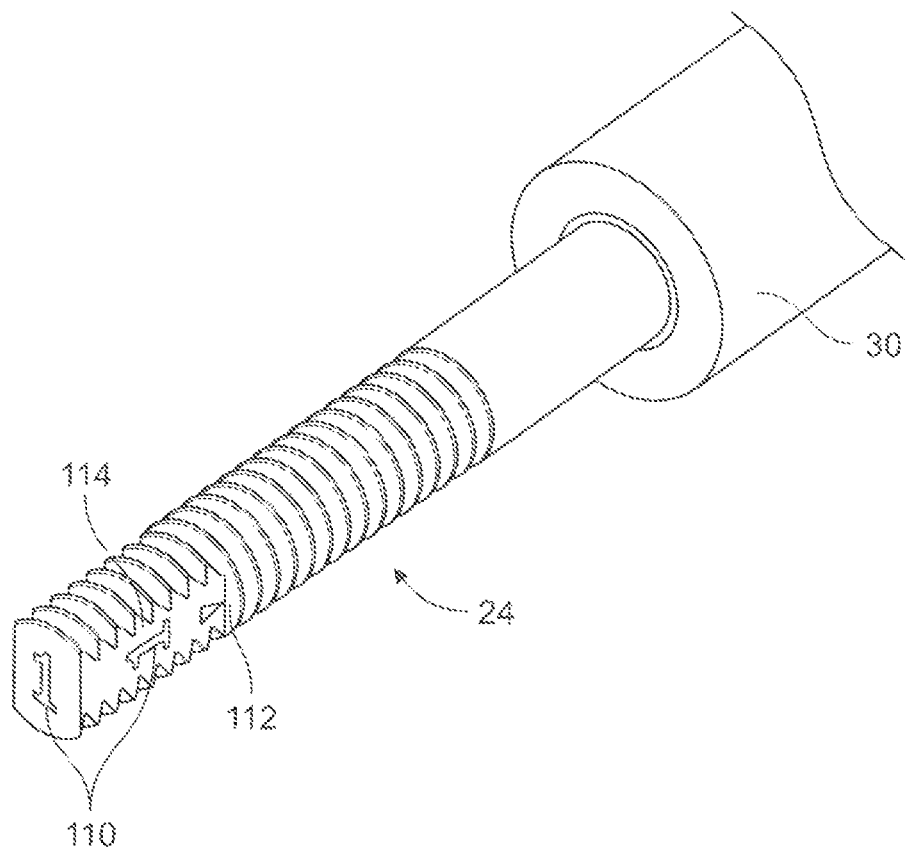
FIG. 21 is a detailed perspective view, showing reference markings on a loading stud.

FIG. 21 shows a particular loading stud 24 used in this example. Each loading stud includes an elongated threaded portion. This threaded portion of the stud is configured to be inserted through a hole in a particular receiver on the collector. The reader will recall that a nut is then placed on the far side of the collector and tightened on the stud to add tension to a particular termination 30 and its attached strand. (FIG. 6 shows a collector 34 with the twelve loading studs 24 protruding through and a nut 40 threaded onto each stud. The threads are not depicted on the studs for purposes of visual clarity).

Returning to FIG. 21, the reader will note a wrench flat 114 is provided on either side of the loading stud. Some kind of engagement feature is typically provided on the loading stud so that it can be held stationary while a nut is tightened on the stud (otherwise the stud tends to turn with the nut). The two wrench flats are provided so that an open end wrench can engage the loading stud and hold it stationary while a larger wrench is used to turn the nut.

In this example, a reference numeral 110 is provided on wrench flat 114 and the end of the stud itself. In addition, hash mark 112 is provided to clearly indicate an angular reference. The function of this hash mark will be explained subsequently.

In the exemplary method, a cable to be configured is loaded into the fixtures depicted in FIG. 13. The loading stud on each termination is passed through collector 34 and coupled to a coupler on a strand tensioner. A tensioning plan is then applied and the rod within each cylinder is allowed to translate as the cable "sets." There are of course many available tensioning plans. In this example, hydraulic pressure is uniformly applied to the strand tensioners up to a fixed pressure.

Figure 22:
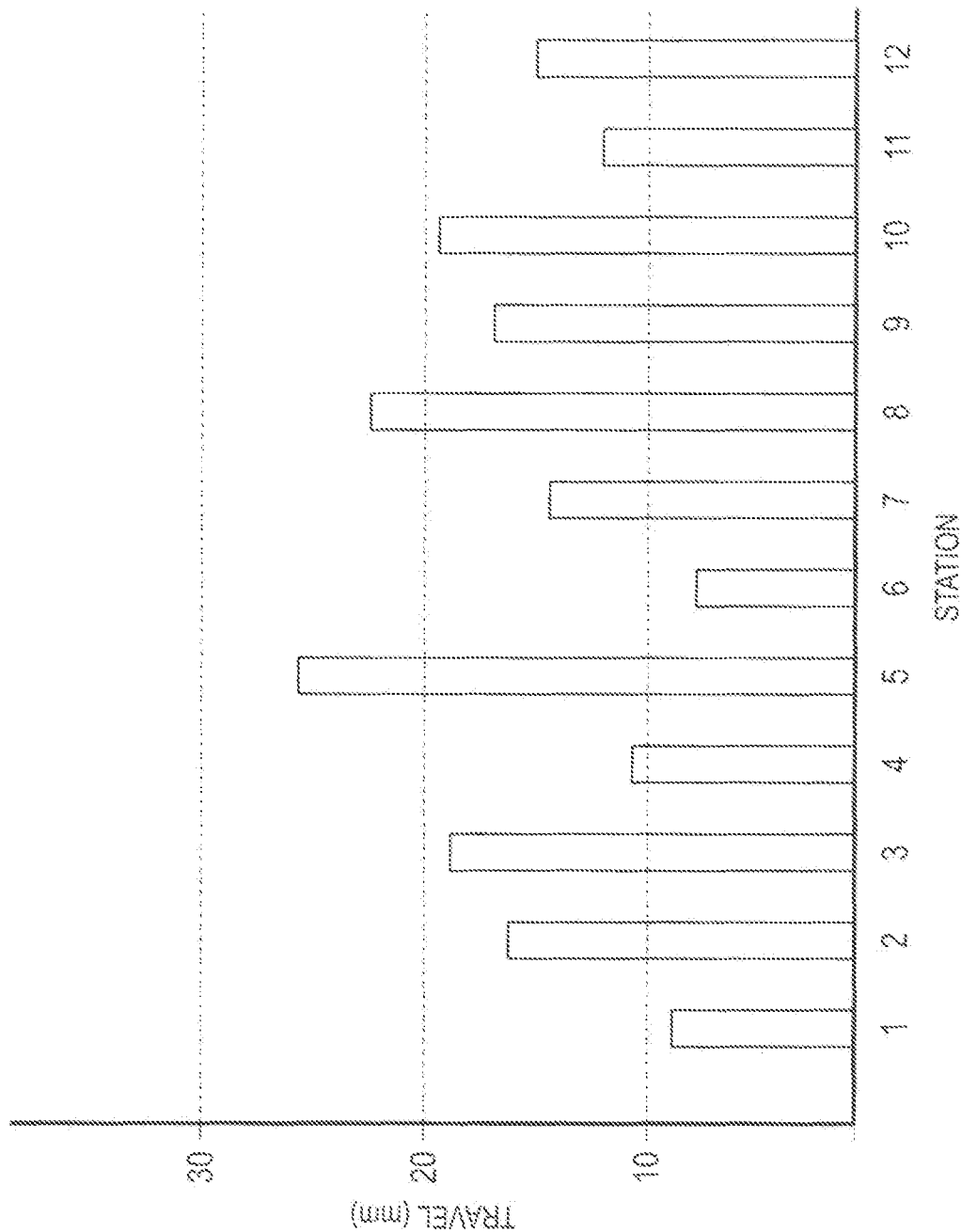
FIG. 22 is a plot showing displacement of the 12 strands in a cable upon application of the inventive method.
Figure 23:
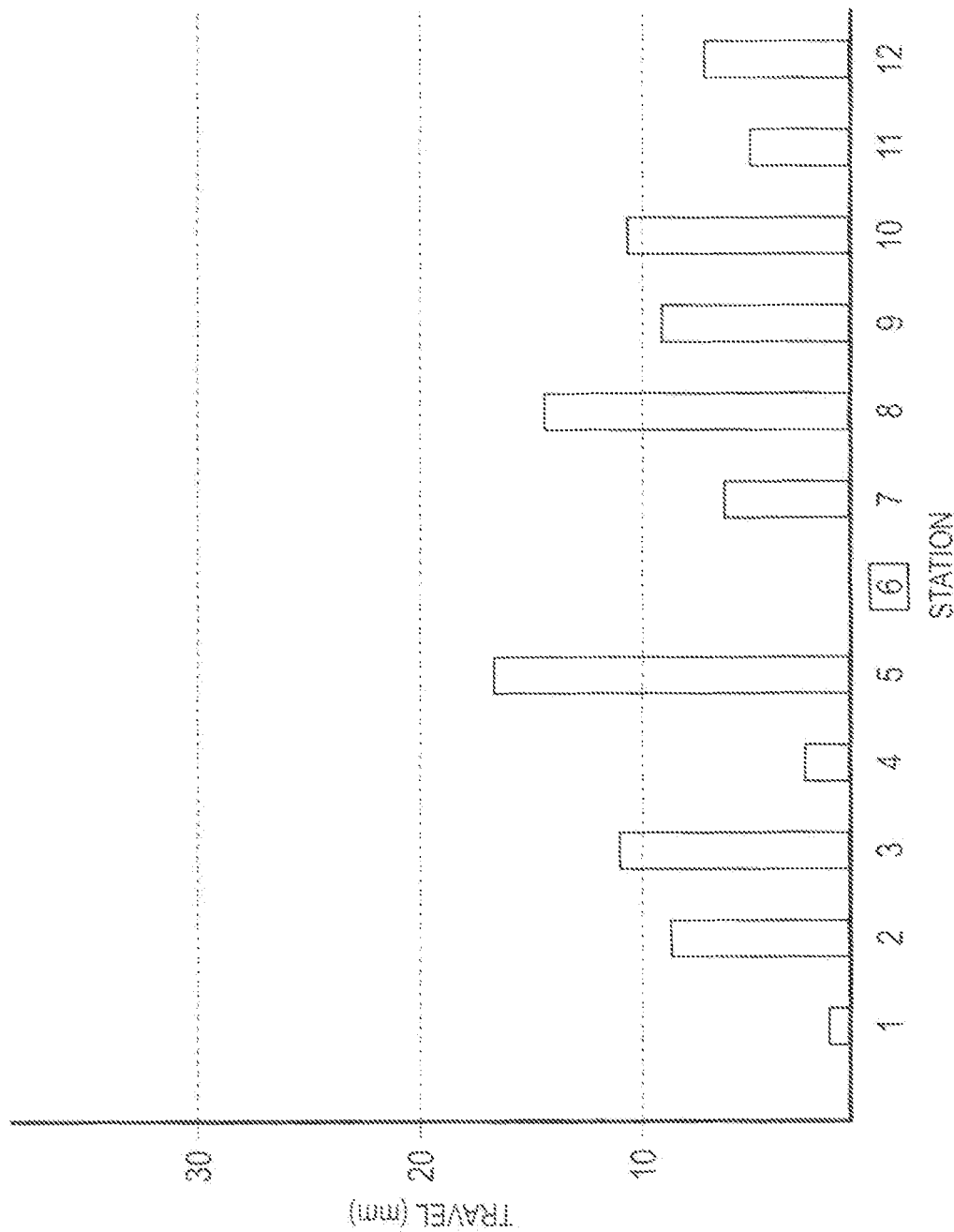
FIG. 23 is a normalized version of the plot of FIG. 22.

The rods in the strand tensioners will translate as the pressure is applied. Some rods will of course translate more than others. FIG. 22 shows a plot of translation for the twelve individual strand tensioners. The reader will note that strand tensioner #6 translated the least (8 mm) while strand tensioner #5 translated the most (26 mm). It is useful to reference all the translations to the minimum value (a form of normalizing). FIG. 23 shows a normalized plot of translation where the value for #6 (8.0 mm) is subtracted from all the values plotted in FIG. 22.

The result is that the plotted value for #6 is 0 and all the other strand tensioners are referenced to it. This plot represents a capturing of the geometric relationships among the various strands. These are the relationships that should be recreated when the cable is assembled by actually connecting each loading stud to the collector.

Figure 24:
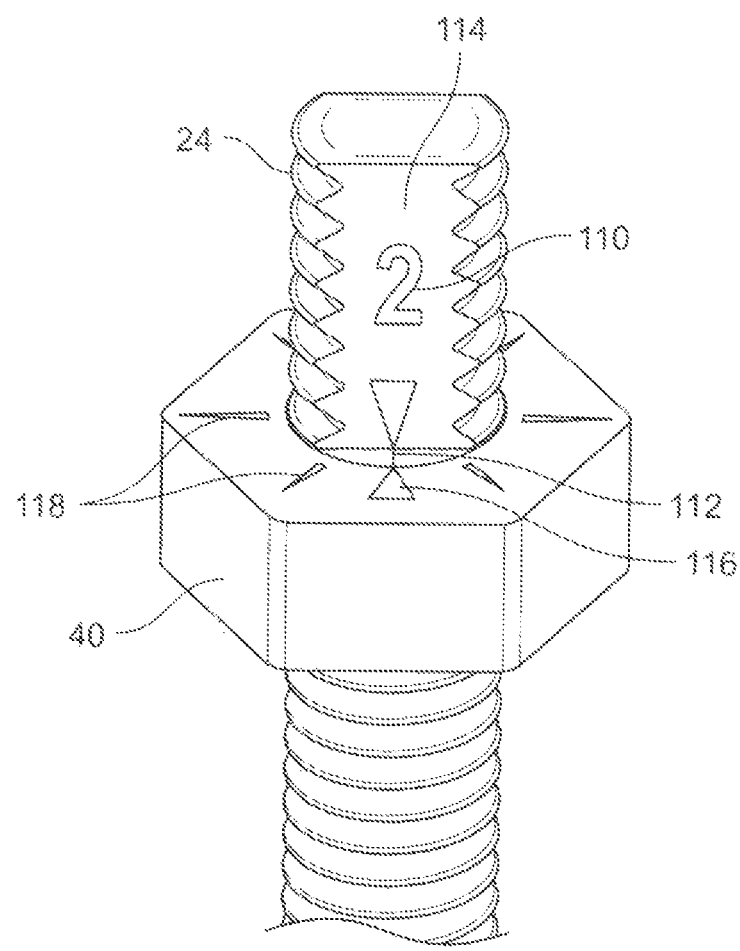
FIG. 24 is a detailed perspective view, showing the alignment of reference marks on a loading stud and a nut used to tighten a particular strand.

This is a useful plot in actually assembling the cable and recreating the spatial relationships that were measured when the cable was in the fixture of FIG. 13. FIG. 24 shows the process of attaching a particular loading stud to the collector. Nut 40 is threaded onto loading stud 24. The particular stud shown is #6, which in this example corresponds to the cable strand having the least translation under load. The nut is threaded down until start position mark 116 on nut 40 aligns with hash mark 112 on the loading stud. These marks are positioned so that the nut is past the wrench flats 114 and therefore fully engaged with the thread.

The particular loading stud shown is an M10 ISO thread, having a thread pitch (coarse series) of 1.5 mm. If a nut is turned through 360 degrees, the nut will move 1.5 mm further down the loading stud. A table may then be calculated that relates the proper position for the other 11 nuts to the position shown of the nut on the #6 stud depicted in FIG. 24. That table is as follows:

| Position | Displacement From #6 | Turns From #6 |
|---|---|---|
| 1 | 1.0 | 0.67 |
| 2 | 8.0 | 5.33 |
| 3 | 11.0 | 7.33 |
| 4 | 3.0 | 2.00 |
| 5 | 16.0 | 10.67 |
| 6 | 0.0 | 0.00 |
| 7 | 6.0 | 4.00 |
| 8 | 14.0 | 9.33 |
| 9 | 9.0 | 6.00 |
| 10 | 11.0 | 7.33 |
| 11 | 5.0 | 3.33 |
| 12 | 7.0 | 4.67 |

Using this table a technician may then assemble the cable in order to recreate the spatial relationships that were establishing in the loading fixture. The cable is assembled as follows:

1. Pass each loading stud through its corresponding hole in the collector and thread a nut onto the exposed end;
2. Tighten all the nuts to the position shown in FIG. 24;
3. Tighten the #1 nut an additional 0.67 turns (using the angular position marks 118 as a reference against hash mark 112 on the loading stud;
4. Tighten the #2 nut an additional 8.00 turns;
5. Tighten the #3 nut an additional 11.0 turns;
6. Tighten the #4 nut an additional 3.0 turns;
7. Tighten the #5 nut an additional 10.67 turns;
8. Tighten the #7 nut an additional 4.00 turns;
9. Tighten the #8 nut an additional 9.33 turns:
10. Tighten the #9 nut an additional 6.00 turns;
11. Tighten the #10 nut an additional 7.33 turns;
12. Tighten the #11 nut an additional 3.33 turns; and
13. Tighten the #12 nut an additional 4.67 turns.

Once this is completed, the spatial relationship that was determined on the loading fixture has been reestablished. The nuts may then be secured using lockwire or some other suitable approach. In some instance, however, additional tightening between the loading studs and the collector may be needed to place the overall cable in a desired state of tension. One may add additional tension while maintaining the desired strand-to-strand spatial relationship. As an example, after following the steps above, one could tighten all twelve nuts one full turn. The spatial relationship among the various strands would still be maintained.

Returning to FIG. 13, some additional observations can be made. Collector 34 is put in place against collector brace 68 to maintain the proper geometry for the individual strands and the terminations on the ends of these strands. In the version depicted, a loading stud protrudes from the end of each termination. These loading studs protrude through the receivers in the collector and the relationship between the loading studs and the receivers helps to establish the geometry that will exist in the completed cable. However, the completed cable may not use the exact same collector that is placed in fixture 64. As long as the same type of collector is used on the completed cable, the establishment of the spatial geometry in the loading fixture will still work. In fact, a single collector 34 may remain in the loading fixture through many cycles. Once the spatial data is recorded for a particular cable, that cable is removed and attached to an entirely separate collector.

Using this approach it is important to have a "defined collector type," which means a specification defining the geometry of a type of collector that can be produced in multiple instances. A collector conforming to this defined collector type may be used to make the spatial measurements during the pre-tensioning process in the fixture. When the cable strands are later connected to a separate collector that will actually be used in the completed cable, the second collector being used in the cable should also conform to the specification of the defined collector type.

This fact does not mean that every collector in a defined collector type must be absolutely identical. If one looks at the exemplary collector 34 in FIG. 4, the reader will perceive that the important geometry concerns the location and nature of receivers 38. For this reason, a simple version (such as depicted in FIG. 4) works well for making the measurements in the loading fixture. A collector intended to actually be attached to a cable might have a deeper loading flange 36 and an external thread on that loading flange. This second collector would still have the same receiver geometry, however, and would therefore be part of the same "defined collector type." This is true because one of the primary objectives of the present invention is determining the relative position that is needed for each strand in order to evenly load the cable. As explained previously, some terminations/strands will have to be advanced further through the receivers 38 than others. It is this geometric relationship that the preloading process determines and then preserves for recreation when the cable is assembled.

The reader will note from the example of FIGS. 20-24 that the inventive approach can determine different types of spatial relationships. One approach is to define the spatial relationship of each strand termination to a defined collector type during the pre-tensioning process and later recreate that spatial relationship to a collector (possibly using a second example of the defined collector type). However, using the collector as the reference is really just a proxy. The inventive method works well as long as the spatial relationship between the strands themselves (during the pre-tensioning process) is accurately recorded and subsequently re-created. A simple example will help explain this fact:

Assume a very simple cable with only three strands. During the pre-tensioning process the displacement of each stand with respect to a defined collector is measured and the results are as follows: Stand 1 moves 8.0 mm with respect to the collector. Strand 2 moves 4.0 mm with respect to the collector. Strand 3 moves 5.0 mm with respect to the collector. The important result is the fact that Stand 1 moves 4.0 mm more than Strand 2 and Strand 3 moves 1.0 mm more than Strand 2. One could then attach the strands to a collector using any desired amount of displacement as long as the relative displacement between the strands is maintained. In other words, Strand 1 should be attached to the collector with an attachment that allows 4.0 mm of additional length compared to the attachment for Strand 2. Likewise the attachment for Strand 3 should allow 1.0 mm of additional length than the attachment for Strand 2.

A main focus of the present invention is determining the relative spatial relationship between the strands that will produce an even load distribution when the cable is placed into service. In some embodiments a collector will not be used in the preloading process at all. Instead, tension will be applied to the anchors themselves and the spatial relationships determined without a collector. These determined spatial relationships will then be subsequently used when the anchors are connected to a collector.

Figure 25:
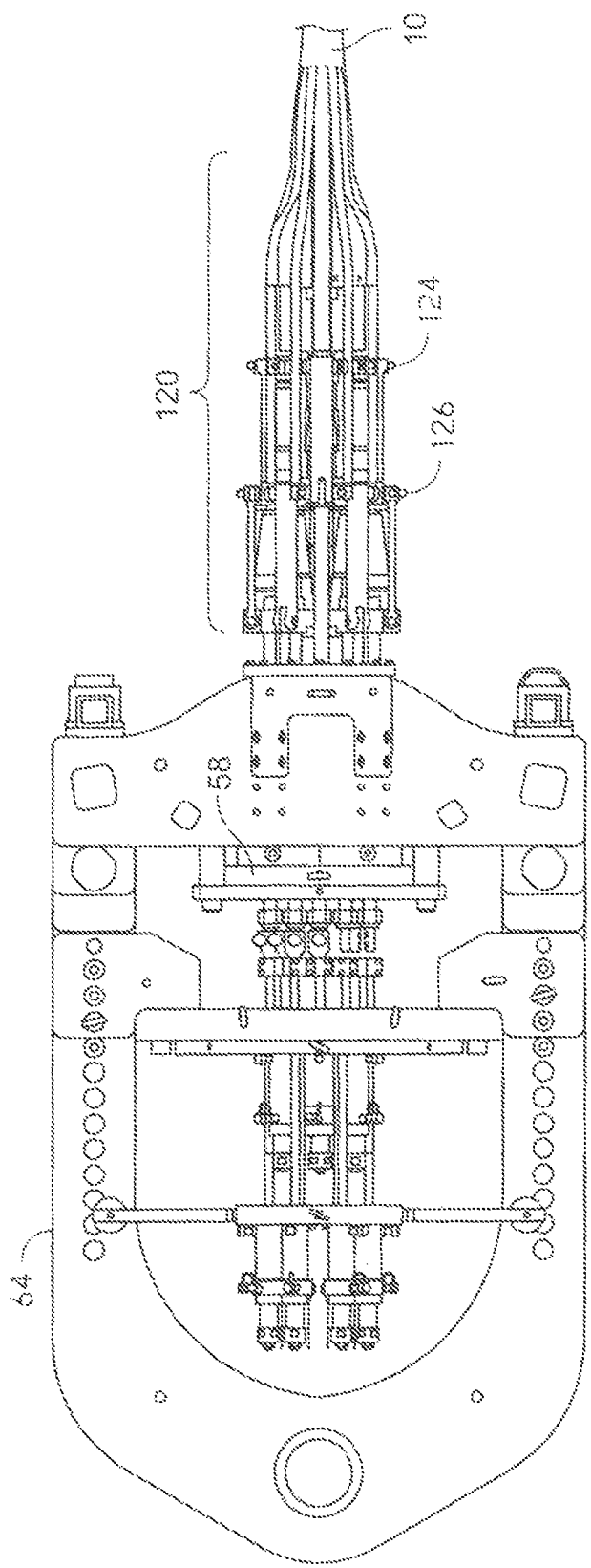
FIG. 25 is a plan view, showing a loading fixture is use with a multi-tiered collector.

FIG. 25 shows a plan view of a fixture 65 used to apply tension to the strands of a cable 10. Fixture 58 guides the strands into the proper geometric configuration for the application of the pretensioning. However, fixture 58 does not contain a collector and is not itself a collector. Cable 10 is connected to multi-tier termination 120. In this example the termination includes collector plane 124 and collector plane 126. Some of the cable's strands connect to the termination at collector plane 124 and others connect at collector plane 126.

Figure 26:
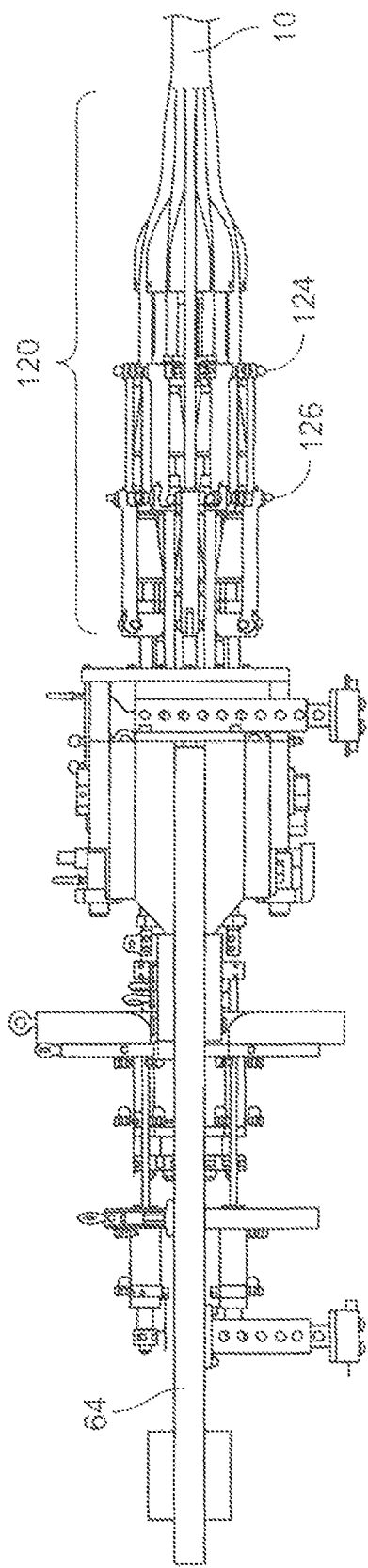
FIG. 26 is an elevation view, showing the assembly of FIG. 25.
Figure 27:
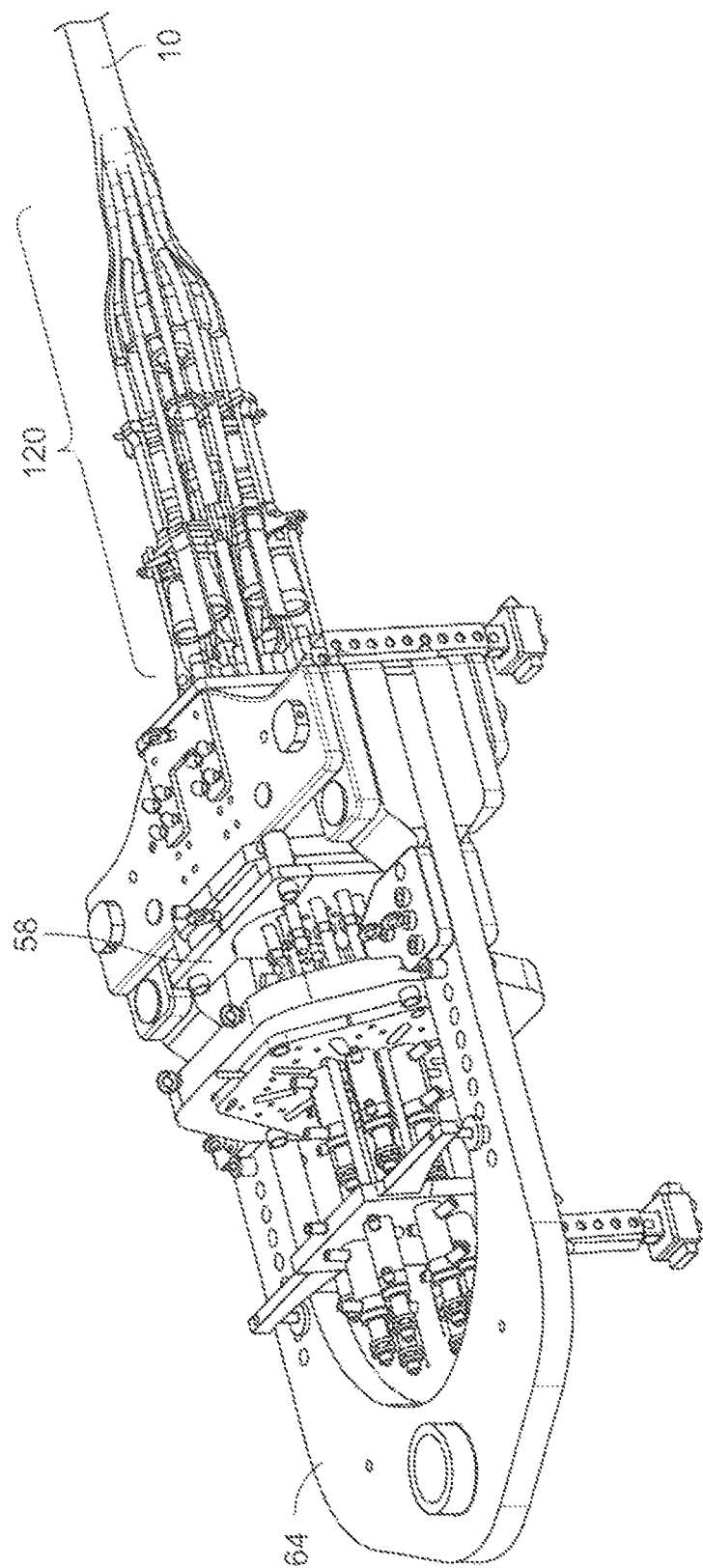
FIG. 27 is a perspective view, showing the assembly of FIG. 25.

FIG. 26 shows the same assembly in an elevation view. FIG. 27 shows the same assembly in a perspective view. The reader will note how the substantial weight of fixture 64 can be supported using legs extending to a planar floor.

Figure 28:
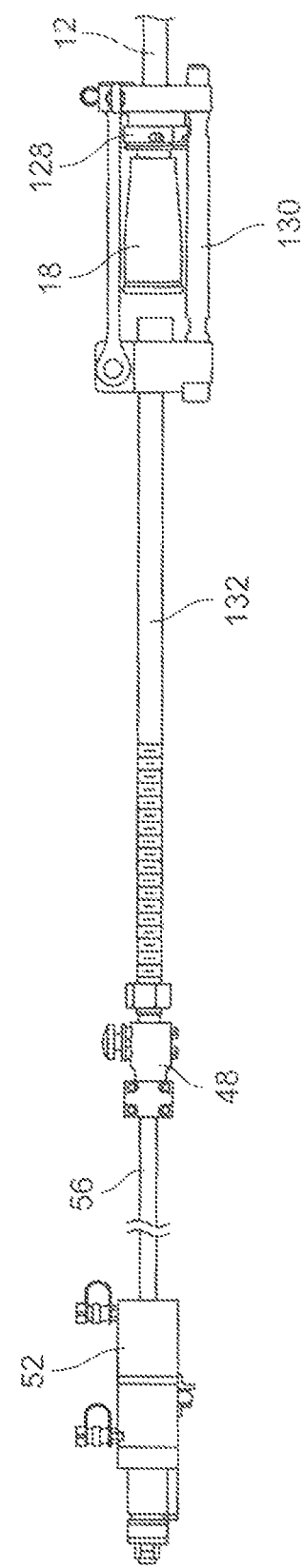
FIG. 28 is an elevation view, showing the use of a coupling fixture to connect a tensioning device to an anchor that includes a loading flange instead of a threaded stud.

The anchors used in the example of FIGS. 25-27 are not a type that includes a threaded stud protruding along the axis of the strand. Instead, each anchor transmits a load from its strand using a loading flange located proximate the anchor's throat. FIG. 28 shows a fixture used to connect such an anchor to a cylinder or other type of component used to apply tension. Loading collar 128 (comprising two halves that are transversely bolted together) is secured proximate the throat portion of the anchor. Fixture 130 clamps around the anchor and bears against loading collar 128. Tension rod 132 connects fixture 130 to coupler 48. Coupler 48 connects the tension rod to a tension applying device—in this case Cylinder 52 (a pneumatic or hydraulic cylinder in this example).

Figure 29:
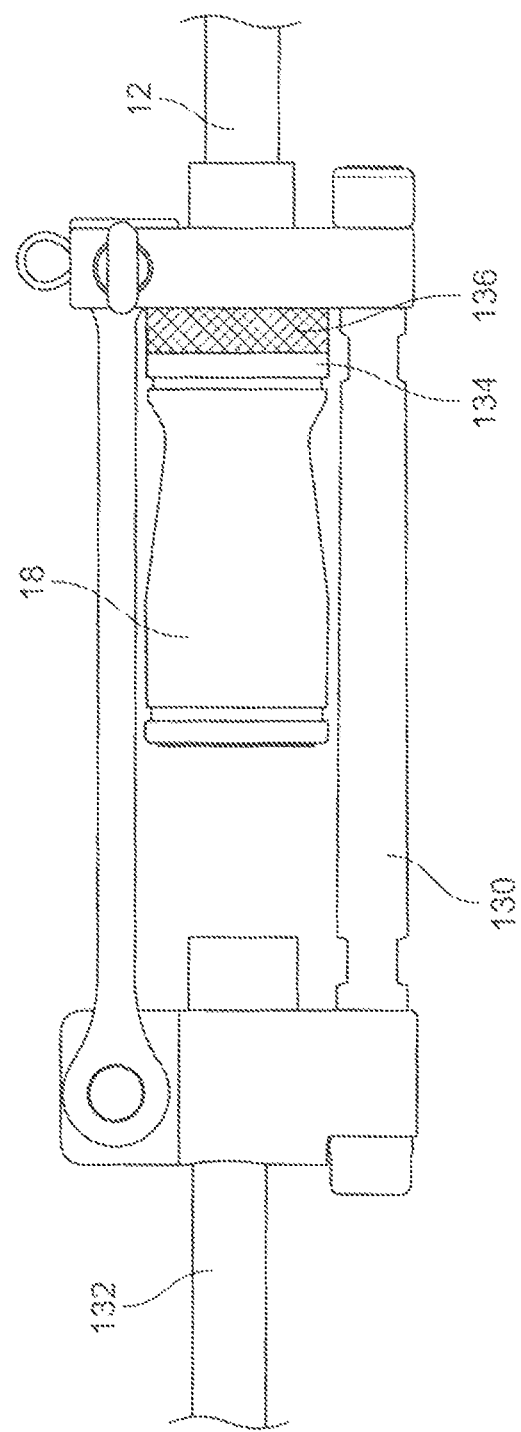
FIG. 29 is a detailed elevation view, showing the coupling fixture of FIG. 28.

FIG. 29 shows the assembly in greater detail. In FIG. 29, loading collar 128 has been replaced with a simple compression shim 136. Fixture 130 is designed to open to allow the fixture to slip over the anchor/strand and connect in place. Once connected as shown, the fixture is able to transmit tensile forces from tension rod 132 to anchor 18.

Figure 30:
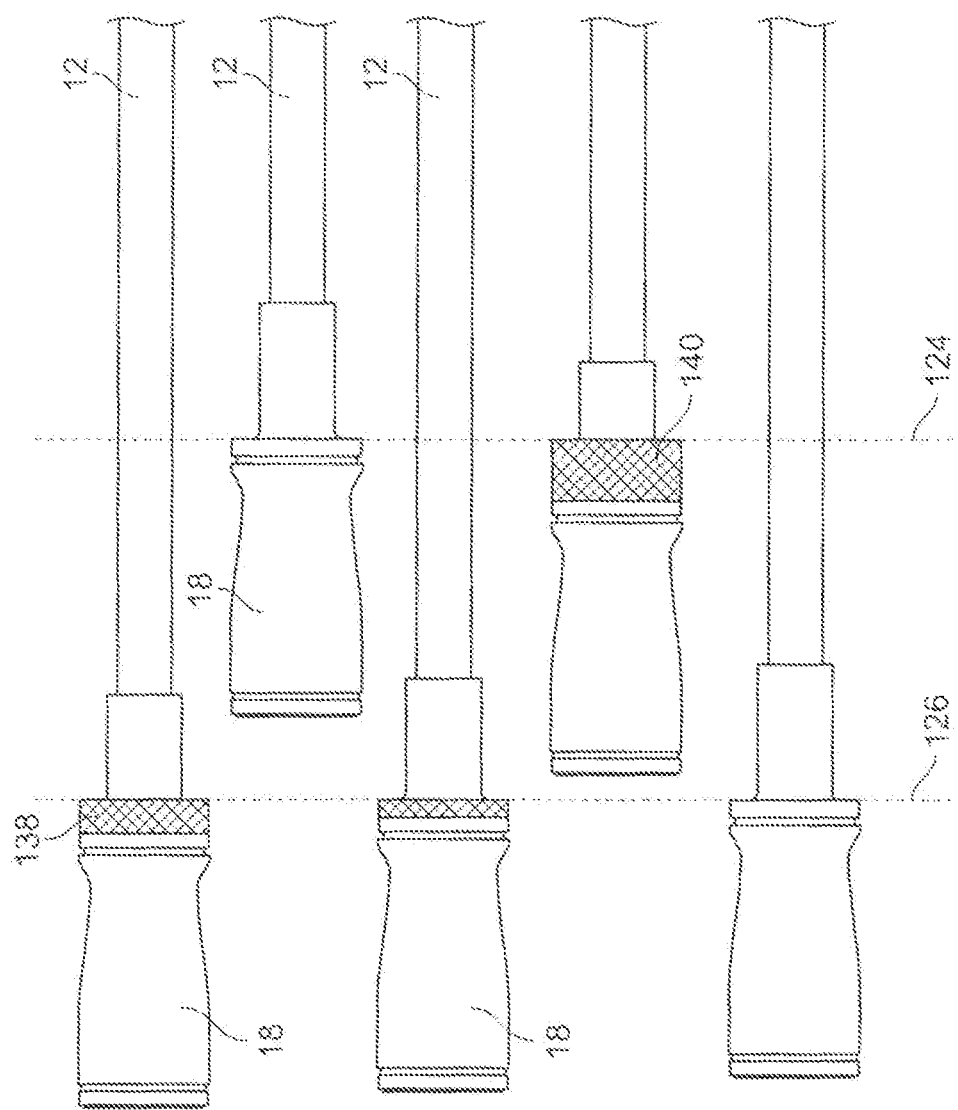
FIG. 30 is an elevation view, showing the arrangement of anchors in a termination including a multi-tiered collector.

FIG. 30 schematically depicts the operation of a termination incorporating a multiple collector planes. Some of the anchors 18 are designed to connect at collector plane 124 while other anchors 18 are designed to connect at collector plane 126. FIG. 30 also depicts the use of variable thickness shims to achieve the proper load balance among the strands. Once the preloading process has determined the proper spatial relationships among the strands, shims of varying thickness can be inserted between the loading flange of each anchor 18 and the collector plane to which is connects. The reader will observe—for example—how shim 138 is significantly thinner than shim 140.

FIG. 31 illustrates still another type of anchor. In this version each anchor 18 includes a loading eye and each strand is passed through the loading eye and woven back into itself to create a connection. Each anchor includes a threaded stud and a loading nut and locking nut is positioned on this threaded stud to create the desired relationship with respect to collector plane 124.

Although the preceding description contains significant detail, it should not be construed as limiting the scope of the invention but rather as providing illustrations of the preferred embodiments of the invention. Those skilled in the art will be able to devise many other embodiments that carry out the present invention. As a first example, the actuators used to apply tension to the strands could be pneumatic cylinders rather than hydraulic cylinders. They could also be screw drives or gear drives. Thus, the language used in the claims shall define the invention rather than the specific embodiments provided.

Having described my invention, I claim:

1. A method for preparing a synthetic cable for use, said synthetic cable having multiple strands with a strand termination affixed to an end of each of said multiple strands, comprising:
    (a) providing a defined collector type having a plurality of receivers, each of said receivers being configured to accept a said strand termination;
    (b) providing a loading fixture;
    (c) connecting an example of said defined collector type to said loading fixture;
    (d) using said loading fixture to apply a predefined tensioning plan to said strand terminations, said tensioning plan being configured to apply an overall tension to said cable and a specific strand tension to each individual strand;
    (e) while said predefined tensioning plan is being applied, determining a spatial relationship between each of said strand terminations and said example of said defined collector type;
    (f) preserving said spatial relationships determined for each of said strand terminations; and
    (g) at a later time, connecting each of said strand terminations to a particular collector conforming to said defined collector type, wherein said connection recreates said spatial relationship determined between each of said terminations and said defined collector type.

2. The method for preparing a synthetic cable for use as recited in claim 1, wherein said step of preserving said spatial relationships comprises measuring and recording a linear translation of each of said terminations during said application of said predefined tensioning plan.

3. The method for preparing a synthetic cable for use as recited in claim 2, wherein said step of measuring said linear translation includes the use of a linear encoder.

4. The method for preparing a synthetic cable for use as recited in claim 1, wherein said particular collector that each of said terminations is attached to is not the same as said example of said defined collector type installed in said fixture.

5. The method for preparing a synthetic cable for use as recited in claim 1, wherein said loading fixture comprises:
    (a) a plurality of strand tensioners; and
    (b) wherein each of said strand tensioners is connected to one of said strand terminations.

6. The method for preparing a synthetic cable for use as recited in claim 5, wherein each of said strand tensioners comprises a hydraulic cylinder.

7. The method for preparing a synthetic cable for use as recited in claim 6, wherein all of said hydraulic cylinders are connected to a single, pressurized reservoir.

8. The method for preparing a synthetic cable for use as recited in claim 5, wherein each of said strand tensioners includes:
 (a) a rod; and
 (b) a linear encoder configured to precisely measure the translation of said rod.

9. The method for preparing a synthetic cable for use as recited in claim 5, wherein each of said strand tensioners comprises an electric drive configured to engage and translate one of said terminations.

10. The method for preparing a synthetic cable for use as recited in claim 6, wherein each of said hydraulic cylinders is a double-acting cylinder.

11. A method for preparing a synthetic cable for use, said synthetic cable having multiple strands with a strand termination affixed to an end of each of said multiple strands, comprising:
 (a) providing a defined collector type having a plurality of receivers, each of said receivers being configured to accept a said strand termination;
 (b) providing a loading fixture;
 (c) installing an example of said defined collector type in said loading fixture;
 (d) using said loading fixture to apply a predefined tensioning plan to said strand terminations, said tensioning plan being configured to apply a specific strand tension to each individual strand;
 (e) while said predefined tension plan is being applied, determining an amount of linear displacement for each of said strands, thereby determining a strand-to-strand spatial relationship among all of said strands; and
 (f) at a later time, connecting each of said strand terminations to a particular collector conforming to said determined strand-to-strand spatial relationship among all of said strands.

12. The method for preparing a synthetic cable for use as recited in claim 11, wherein said strand tensioning plan comprises evenly dividing said overall tension among all of said strands.

13. The method for preparing a synthetic cable for use as recited in claim 11, wherein said loading fixture comprises:
 (a) a plurality of strand tensioners; and
 (b) wherein each of said strand tensioners is connected to one of said strand terminations.

14. The method for preparing a synthetic cable for use as recited in claim 13, wherein each of said strand tensioners comprises a hydraulic cylinder.

15. The method for preparing a synthetic cable for use as recited in claim 14, wherein all of said hydraulic cylinders are connected to a single, pressurized reservoir.

16. The method for preparing a synthetic cable for use as recited in claim 11, wherein each of said strand terminations includes a threaded loading stud with a nut threaded onto said loading stud, said nut being configured to bear against said collector.

17. The method for preparing a synthetic cable for use as recited in claim 13, wherein each of said strand tensioners comprises an electric drive configured to engage and rotate one of said nuts.

18. The method for preparing a synthetic cable for use as recited in claim 14, wherein each of said hydraulic cylinders is a double-acting cylinder.

19. The method for preparing a synthetic cable for use as recited in claim 14, wherein each of said strand tensioners includes:
 (a) a rod; and
 (b) a linear encoder configured to measure a translation of said rod.

20. The method for preparing a synthetic cable for use as recited in claim 19, wherein an output from each of said linear encoders is connected to a central controller.

* * * * *